US007000193B1

(12) United States Patent
Impink, Jr. et al.

(10) Patent No.: US 7,000,193 B1
(45) Date of Patent: Feb. 14, 2006

(54) DISPLAY TO FACILITATE THE MONITORING OF A COMPLEX PROCESS

(76) Inventors: Albert J. Impink, Jr., 288 Rehoboth Bay Community, Rehoboth Beach, DE (US) 19971; Jennifer Christman, 41 Canal Dr., Millsboro, DE (US) 19966; Bradley L. Travis, 8 Sand Dune Dr., Lewes, DE (US) 19958; Thomas D. Griesser, 215 Chrisman Dr., Elverson, PA (US) 19520

( * ) Notice: Subject to any disclaimer, the term of this patent is extended or adjusted under 35 U.S.C. 154(b) by 688 days.

(21) Appl. No.: 10/133,713

(22) Filed: Apr. 26, 2002

Related U.S. Application Data

(63) Continuation-in-part of application No. 10/068,969, filed on Feb. 7, 2002, now abandoned.

(51) Int. Cl.
*G09G 5/00* (2006.01)
(52) U.S. Cl. ............ 715/771; 715/772; 715/763; 700/17; 700/108
(58) Field of Classification Search ............ 715/771, 715/772, 762, 763, 778, 841; 345/1.1–1.3; 376/259, 216; 700/9, 10, 12, 17, 19, 28, 700/32, 92, 108, 115
See application file for complete search history.

(56) References Cited

U.S. PATENT DOCUMENTS

| | | | |
|---|---|---|---|
| 4,552,718 A | 11/1985 | Impink, Jr. et al. | |
| 4,803,039 A | 2/1989 | Impink, Jr. et al. | |
| 4,816,208 A | 3/1989 | Woods et al. | |
| 5,227,122 A * | 7/1993 | Scarola et al. | 376/259 |
| 5,241,482 A * | 8/1993 | Iida et al. | 700/110 |
| 5,321,800 A | 6/1994 | Lesser | |
| 5,353,315 A * | 10/1994 | Scarola et al. | 376/259 |
| 5,375,199 A | 12/1994 | Harrow et al. | |
| 5,623,590 A | 4/1997 | Becker et al. | |
| 5,877,764 A | 3/1999 | Feitelson et al. | |
| 6,211,880 B1 * | 4/2001 | Impink, Jr. | 345/418 |
| 6,222,547 B1 * | 4/2001 | Schwuttke et al. | 345/419 |
| 6,380,949 B1 * | 4/2002 | Thomas et al. | 715/705 |
| 6,393,386 B1 * | 5/2002 | Zager et al. | 703/25 |
| 6,529,137 B1 * | 3/2003 | Roe | 340/691.1 |
| 6,532,425 B1 * | 3/2003 | Boost et al. | 702/63 |
| 6,577,323 B1 * | 6/2003 | Jamieson et al. | 715/700 |
| 6,690,274 B1 * | 2/2004 | Bristol | 340/506 |
| 6,773,932 B1 * | 8/2004 | Robinson et al. | 438/14 |
| 6,853,920 B1 * | 2/2005 | Hsiung et al. | 702/1 |

* cited by examiner

*Primary Examiner*—Tadesse Hailu
(74) *Attorney, Agent, or Firm*—Daniel C. Abeles; Eckert Seamans Cherin & Mellott, LLC

(57) ABSTRACT

A display organized with the various components of a complex process represented by the rows, and selected parameters to be monitored listed in columns. The fields of the display which represent a particular "vital sign" for a particular component present two types of information: (1) alarms which indicate whether the parameter is in or out of limits and how close it is to failure; and (2) trends which indicate changes and types of changes, but do not pose a threat to the system. The alarms, in most part, are represented by solid colors. The trends are shown by the interface line between two contrasting colors or shades of colors defining the trend line and showing the direction of the trend and type of change.

45 Claims, 20 Drawing Sheets

TYPICAL "VITAL SIGNS" DISPLAY GENERATED BY THE PREFERRED EMBODIMENT OF THE INVENTION

BASE-LINE WORKSHEET

| | REF | MONDAY | | TUESDAY | | WEDNESDAY | | THURSDAY | | FRIDAY | | WEEK ENDING | | |
|---|---|---|---|---|---|---|---|---|---|---|---|---|---|---|
| DATE | | 1/31/00 | | 2/1 | | 2/2 | | 2/3 | | 2/4 | | 2/4/00 | | |
| CLOCK TIME (MILITARY) | | 1431 | | 1513 | | 1432 | | 1437 | | 1505 | | | | |
| SERVER UP TIME | | 9:15:57 | | 10:16:38 | | 11:15:58 | | 12:16:02 | | 13:16:31 | | | | (A) |
| UTILIZATION MAX % | 1.0 | 4 | 96 | 9 | 98 | 2 | 94 | 4 | 99 | 4 | 99 | 1.2 | +0.2 | (F) |
| PERSISTENCE SEC | 0 | | | | | | | | | | | 0 | | (C) |
| DIRTY CACHE REC. | | 0 | 53 | 0 | 406 | 0 | 92 | 1 | 534 | 0 | 76 | | | |
| CURRENT DISK REC. | | 0 | 27 | 0 | 35 | 0 | 8 | 0 | 142 | 0 | 44 | | | |
| TOTAL CACHE BUFFERS | 81289 | 67256 | | 67107 | | 66937 | | 66882 | | 66773 | | | | |
| PACKET REC. BUFFER \1\ (50) | 3000 | 216 | | 219 | | 346 | | 360 | | 368 | | 12.3 | | (G) |
| DIP.CACHE BUFFER \4\ (20) | 2000 | 761 | | 767 | | 767 | | 779 | | 780 | | 39.0/0.6 | +0.950 | (H) |
| SERVICE PROCESSES \11\ (10) | 200 | 97 | | 103 | | 121 | | 128 | | 138 | | 69.0/9.19 | +0.988 | (E) |
| CONNECTIONS IN USE | 500 | 428 | | 447 | | 438 | | 436 | | 391 | | | | |
| OPEN FILES | 543 | ~570 | | ~687 | | ~528 | | ~564 | | ~680 | | 606 | | |
| REDIRECTION BLOCKS/REDIRECTED BLOCKS | 2260 | 0 | | 0 | | 0 | | 0 | | 0 | | | | |
| REDIRECTION BLOCKS/REDIRECTED BLOCKS | - | - | | - | | - | | - | | - | | | +0.997 | |
| TOTAL PACKETS SENT (ETHERNET) | $17.938^6$ | $634.464^6$ | | $654.804^6$ | | $669.465^6$ | | $682.480^6$ | | $700.251^6$ | | $15.925^6$ | -11.2 | (C) |
| TOTAL PACKETS RECEIVED (ETHERNET) | $18.669^6$ | $641.276^6$ | | $660.911^6$ | | $674.993^6$ | | $687.510^6$ | | $707.333^6$ | | $15.868^6$ | -15.0 | (D) |
| NO ECE AVAILABLE COUNT (ETHERNET) | | 553 | | 566 | | 868 | | 916 | | 944 | | | +0.997 | |
| CHECK SUM ERRORS (ETHERNET) | 0 | 0 | | 0 | | 0 | | 0 | | 0 | | 0 | 0 | (B) |
| TOTAL PACKETS SENT (SDLC) | | - | | - | | - | | - | | - | | | | |
| TOTAL PACKETS RECEIVED (SDLC) | | - | | - | | - | | - | | - | | | | |
| LONG TERM CACHE HITS % | | 100 | | 100 | | 100 | | 100 | | 100 | | 100 | | (J) |
| LONG TERM DIRTY HITS % | | 99 | | 99 | | 99 | | 100 | | 99 | | | | |
| LRU (DAY/HOUR) SITTING TIME | | 0:14 | | 0:05 | | 0:06 | | 0:06 | | 0:02 | | 0:02 | +0.967 | |
| TOTAL ALLOCATION REQUESTS | $2.048^6$ | $18.515^6$ | | $19.415^6$ | | $23.231^6$ | | $24.185^6$ | | $29.338^6$ | | $2.652^6$ | +29.5 | (K) |
| TOTAL ALLOCATED FROM LRU | $2.004^5$ | $17.939^6$ | | $18.797^6$ | | $22.562^6$ | | $23.477^6$ | | $28.468^6$ | | $2.574^6$ | -97.1 | (L) |
| ALLOC MEMORY POOL % | | 5 | | 5 | | 6 | | 6 | | 6 | | | +0.967 | |
| CACHE BUFFERS % | 82.8 | 82 | | 82 | | 82 | | 82 | | 82 | | 82.0 | -0.8 | (I) |
| CACHE MOVABLE MEMORY % | | 6 | | 6 | | 6 | | 6 | | 6 | | | | |
| CACHE NONMOVABLE MEMORY % | | 0 | | 0 | | 0 | | 0 | | 0 | | | | |
| TOTAL SERVER WORK MEMORY | $334.8^6$ | → | | → | | → | | → | | → | | | | |
| PURGED | | | | | | | | | | | | | | |
| FILES DELETED | 4435 | | | | | 14883 | | | | | | 14883 | | |
| ADDITIONAL FILES DELETED | 1163 | | | | | 1804 | | | | | | 1804 | | |
| ACTUAL HARD DISC MEMORY % | 81.8 | | | | | 83.1 | | | | | | 83.1 | +1.3 | (M) |
| DECOMPA HARD DISC MEMORY % | 168.9 | | | | | 174.9 | | | | | | 174.9 | 174.9 | (N) |

| WEEK ENDING / SERVER (HUB/SWITCH) | TYPE | CONSOLE | NETWORK BOARDS | | | PROCESSOR | | MEMORY | | | | | | HARD DISK | | |
|---|---|---|---|---|---|---|---|---|---|---|---|---|---|---|---|---|
| | | A UPTIME | B CHECK SUM ERRORS | C PACKETS SEND RATE | D PACKETS RECEIVE RATE | E SERVICE PROCESSES | F THREAD SPINNING | G PACKETS RECEIVE BUFFERS | H DIRECTORY CACHE BUFFERS | I FILE CACHE BUFFERS | J CACHE HIT FREQUENCY | K CACHE BUFFER ALLOCATIONS | L ALLOCATIONS OF LRU BUFFERS | M ACTUAL HARD DISK SPACE | N DECOMPRESSED DISK SPACE | O AGGRESSIVE SUBALLOCATION |
| XXX-1 (YYY-A) | 3.1 | 2:04 | 0 | -3.7 / 1.000 | -3.5 / 1.000 | 9999 | 0.0 | 9999 | 9999 / 9999 | 0.0 | | | | +0.1 | | |
| XXX-2 (YYY-B) | 3.1 | 9:17 | 0 | +0.7 / 1.000 | -1.9 / 1.000 | 9999 | 0.0 | 9999 | 9999 / 9999 | -1.1 | | | | +0.6 | | |
| XXX-3 (YYY-A) | 4.1 | 3:22 | 0 | -19.3 / 1.000 | -19.4 / .991 | 42.5 | +0.1 | 11.7 | 0.165 / .965 | +0.1 | 100.0 | +8.6 / .996 | 92.4 | +2.3 | 122.7 | 0 |
| XXX-4 (YYY-A) | 4.1 | 9:17 | 0 | +29.5 / .982 | +14.4 / .982 | 42.0 | +0.1 | 12.0 | 0.006 / .994 | +0.1 | 100.0 | +108.2 / .994 | 96.2 | +11.0 | 103.0 | 0 |
| XXX-5 (YYY-A) | 4.1 | 9:19 | 0 | -13.8 / 1.000 | -11.8 / 1.000 | 46.0 | +0.4 | 40.0 | 0.065 / 1.000 | 75.0 | 100.0 | +34.6 / 1.000 | 81.3 | -1.5 | 127.6 | 0 |
| XXX-6 (YYY-B) | 4.1 | 9:18 | 0 | -1.4 / 1.000 | -1.2 / .999 | 40.0 | 0.0 | 50.0 | 0.066 / .991 | -0.7 | 98.0 | -0.1 / 1.000 | 99.1 | 94.1 | 120.9 | 0 |
| XXX-7 (YYY-C) | 4.1 | 106.05 | 17 | +36.7 / .992 | +6.0 / .799 | 40.0 | 0.0 | 50.0 | 0.034 / .934 | 65.0 | 96.0 | 0.0 / .999 | 77.9 | 9999 | 9999 | 0 |
| XXX-8 (YYY-D) | 4.1 | 9:18 | 0 | -26.8 / .992 | -41.0 / .995 | 40.0 | 0.0 | 51.0 | 0.005 / 1.000 | -0.7 | 96.4 | +2.2 / .996 | 99.3 | -0.3 | 103.1 | 0 |
| XXX-9 (YYY-D) | 4.1 | 4:04 | 0 | -22.7 / 1.000 | -12.7 / 1.000 | 28.0 | 0.0 | 51.0 | 0.073 / .988 | 0.0 | 99.8 | -44.5 / .994 | 0.0 | +0.3 | 0.0 | 0 |
| XXX-10 (YYY-C) | 4.1 | 9:16 | 0 | -3.4 / 1.000 | -7.3 / 1.000 | 42.5 | 0.0 | 10.0 | 0.025 / .866 | 67.8 | 100.0 | -4.4 / .993 | 0.0 | +0.2 | 0.0 | 0 |
| XXX-11 (YYY-B) | 4.1 | 3:23 | 0 | 9999 / .999 | 9999 / 9999 | 30.0 | 0.0 | 13.3 | 5x=.89 | 0.0 | 100.0 | 9999 / .996 | 0.0 | -11.6 | 0.0 | 0 |
| XXX-12 (YYY-C) | 4.1 | 9:20 | 0 | -13.9 / .998 | -13.7 / .999 | 32.5 | 0.0 | 10.0 | 5x=.58 | 0.0 | 100.0 | +15.5 / .994 | 0.0 | -0.1 | 0.0 | 0 |
| XXX-13 (YYY-E) | 4.1 | 0:16 | | 9999 / 9999 | 9999 / 9999 | 27.5 | 0.0 | 50.0 | 5x=.58 / 9999 | 0.0 | 100.0 | 9999 / 9999 | 0.0 | 9999 | 9999 | 0 |

TYPICAL "VITAL SIGNS" DISPLAY GENERATED BY THE PREFERRED EMBODIMENT OF THE INVENTION

ALARM TILES LEGEND

CHANGE TILES LEGEND

TYPICAL DARK DISPLAY MODE DISPLAY IN THE
OPERATOR'S VERSION OF THE INVENTION

TYPICAL SERVER HISTORY MODE DISPLAY IN THE
ANALYST'S VERSION OF THE INVENTION

FIG. 10

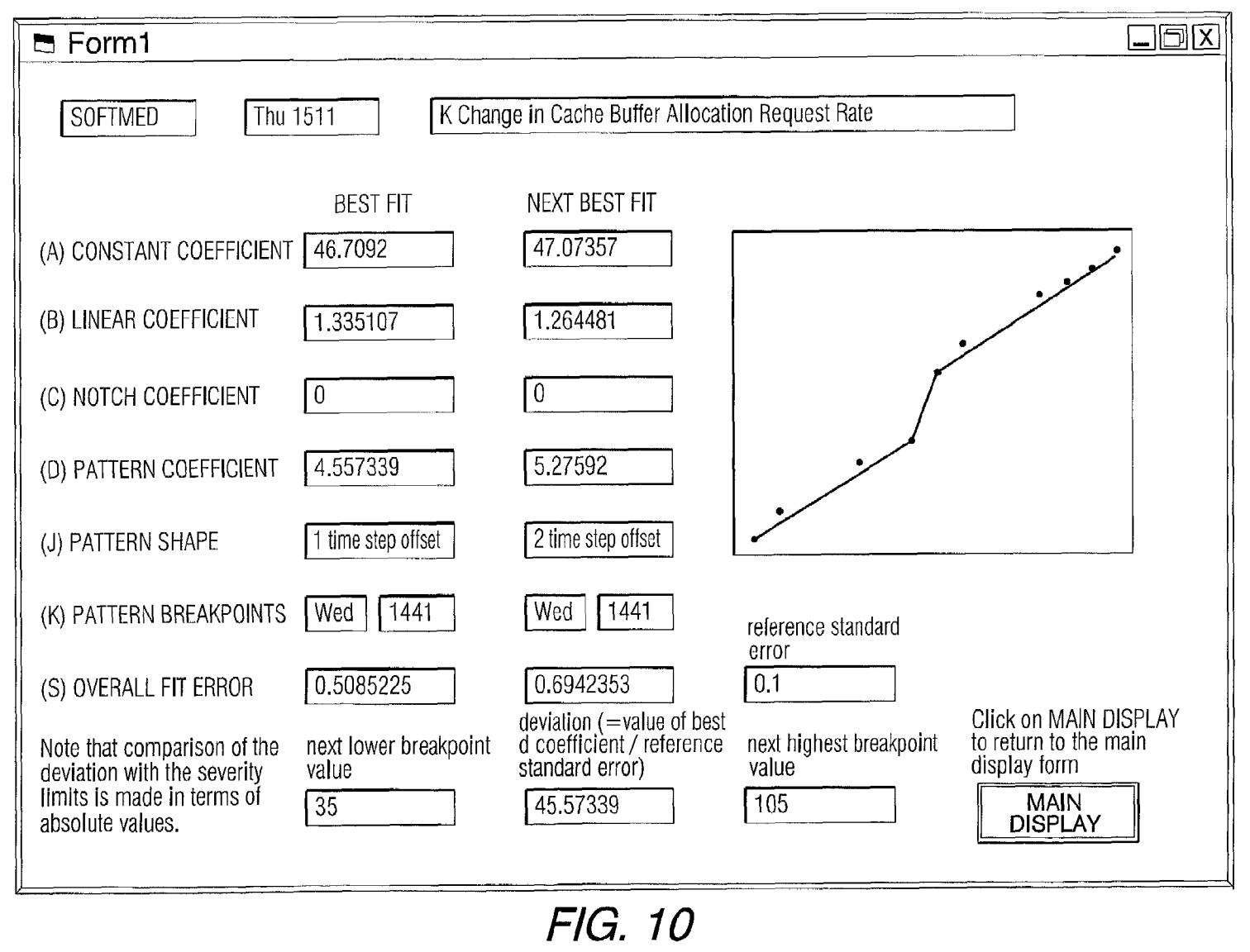

Form1

SOFTMED    Thu 1511    K Change in Cache Buffer Allocation Request Rate

|  | BEST FIT | NEXT BEST FIT |
|---|---|---|
| (A) CONSTANT COEFFICIENT | 46.7092 | 47.07357 |
| (B) LINEAR COEFFICIENT | 1.335107 | 1.264481 |
| (C) NOTCH COEFFICIENT | 0 | 0 |
| (D) PATTERN COEFFICIENT | 4.557339 | 5.27592 |
| (J) PATTERN SHAPE | 1 time step offset | 2 time step offset |
| (K) PATTERN BREAKPOINTS | Wed 1441 | Wed 1441 |
| (S) OVERALL FIT ERROR | 0.5085225 | 0.6942353 |
|  |  | deviation (=value of best d coefficient / reference standard error) |
|  |  | 45.57339 |

Note that comparison of the deviation with the severity limits is made in terms of absolute values.

next lower breakpoint value: 35 reference standard error: 0.1 next highest breakpoint value: 105

Click on MAIN DISPLAY to return to the main display form

MAIN DISPLAY

DISPLAY TO FACILITATE THE MONITORING OF A COMPLEX PROCESS

CROSS REFERENCE TO RELATED APPLICATION

This application is a Continuation-In-Part of U.S. application Ser. No. 10/068,969, filed Feb. 7, 2002, now abandoned.

BACKGROUND OF THE INVENTION

1. Field of the Invention

This invention relates in general to monitoring systems and more particularly to monitoring systems that monitor corresponding parameters of a plurality of components in a system, that clearly distinguish between information relating to normally encountered changes in operating parameter values and information relating to actual or pending failure states for a complex process, in an integrated display.

2. Related Art

In complex processes, it is desirable to monitor critical operating parameters or derivative values indicative of the state of the process. These "vital signs" are the quantitative representations of the time varying values of selected parameters, absolute or relative, directly monitored or indirectly derived from the monitored values which, taken together, provide an indication of the current "health" of the process. Two major indications of the state of the process are generally of interest:

1) Indications that operating parameters relating to the process are changing or have recently changed, typically as a result of human intervention in the process. This human intervention may take the form of adjustment or change of the characteristics of the process, or it may take the form of changes in inputs to the process. Both changes to the characteristics of the process and changes in inputs can be expected to propagate throughout the process as automatic controls detect the effects of the changes and respond to the detected changes in an attempt to maintain process stability. Such indicated changes in operating parameter values usually are of interest only in terms of automatic control system stability or of process history, although they can, under some circumstances, be seen as precursors of impending local or overall process breakdown.

2) Indications of existing or pending process faults due to component overload or failure as a result of control system instability or physical damage. Such indications are of immediate interest to the human operators responsible for overseeing the proper functioning of the process and serve to stimulate protective human intervention either to reconfigure the process or to shut it down completely to prevent further component damage or, conceivably, the development of potential hazardous conditions.

In the past, visual displaying of the "vital signs" of a complex process was usually accomplished by the use of two independent monitoring and display systems operating in parallel. Thus, in a typical process control room, operating parameter values were usually indicated by analog or, more recently, digital, meters and changes in such values were detected by observing variations on graphical chronological records or in manually or automatically recorded periodic logs of prescribed sets of parametric values. On the other hand, indications of abnormal conditions or component failure appeared in the form of color coded lights on process mimics or as individually lighted message tiles on annunciator panels. More recently, a display system that combines both the process monitoring and the process alarming functions in driving a single, integrated, spatially organized textual display panel has been developed as described in U.S. Pat. No. 4,816,208. Due to unique application restrictions existing at the time this system was developed, the display was monochromatic and the distinction between normal changes in operating parameter values and abnormal state indications could be made only by assigning priorities to the predefined textual messages that could appear in given fields of the display panel. As a result, extensive training of the process operators in the interpretation of displayed information was required before the system could be used effectively.

A more flexible system is desired that would enable an operator to more readily integrate the data displayed to discern the state of the system. It is also desirable that the corresponding operating parameters of analogous components within the system be displayed together so their operating states can be correlated.

Thus, it is an object of this invention to provide a single, integrated parameter display that clearly distinguishes between information relating to normally encountered changes in operating parameter values and information relating to actual or pending failure states for a complex process.

It is a further object of this invention to provide such a display that identifies trends of critical process parameters.

It is an additional object of this invention to provide an integrated display that shows the recent past history of critical operating parameters.

SUMMARY OF THE INVENTION

This invention achieves the aforegoing objects by providing a display system for tracking a process having a plurality of analogous components that are respectively monitored by corresponding sensors that provide signal outputs representative of an operating condition of the component monitored. The sensor signal outputs are preferably received at a central input terminal to a processor. The processor operates on the input signals and provides display outputs which are representative of the monitored parameter or a signal derived from the monitored parameter which is more indicative of the operating state of the component being monitored. These display outputs are communicated to a plurality of display tiles arranged in columns and rows. Either of the columns or rows are respectively representative of the analogous components and the other of the columns or rows are respectfully representative of a vital sign of the corresponding component indicative of the component's operating condition derived from the corresponding signal output. Each display tile portrays a state of the corresponding vital sign in either a color coded alarm format, which indicates whether the vital sign is within or out of operating limits and how close to the limits it is or a color coded representation of trends format which identifies changes in the vital sign.

In one preferred embodiment the color coded representation of trends is a coded geometric shape. In still another preferred embodiment, the color coded representation of trends format identifies a change in value of the vital sign or a rate of change of the value of the vital sign over a period of time. In still another embodiment, the color coded representation of trends is a coded geometric shape that employs color to emphasize the magnitude of a change in value or rate of change in value of the vital sign. Preferably, the color coded representation of trends format identifies the direction in the change in value of the vital sign. In still another embodiment, the trends format provides a color coded prediction of when an event related to the monitored parameter is likely to occur.

Preferably, the display tiles are updated periodically and substantially each tile is programmed to display an indication when the visual format of that tile has changed since the most recent prior update of the display. In one enhancement, the display tiles are programmed to identify by a color code if either a condition exists where the data measured or calculated for the vital sign is not meaningful or not available or an arithmetical logical operation failed or the tile is a null placeholder in the display. Another enhancement provides a color coded alarm display format that distinguishes between (i) alarm states in which component malfunction or failure either has occurred or can be expected where a limiting value used for a set point is a true physical limit and (ii) those where the limiting value used for the set point is an administrative limit.

Preferably, the monitor of this invention can be displayed in a number of formats, each providing specific information to address given conditions. The invention further contemplates the display being presented at more than one location to address different functions such as that of an operator and an analyst, and preferably, with the ability of the analyst to communicate with the operator through the display.

BRIEF DESCRIPTION OF THE DRAWINGS

The file of this patent contains at least one drawing executed in color. Copies of this patent with color drawings will be provided by the United States Patent and Trademark Office upon request and payment of the necessary fee.

A further understanding of the invention can be obtained from the following description of the preferred embodiments when read in conjunction with the accompanying drawings in which:

FIG. 2 is an example of a typical prior art spreadsheet employed for manual data collection;

FIG. 3 is an example of a typical prior art spreadsheet summary of a vital sign readout of the process;

FIG. 10 is a pictorial representation of another display mode of an embodiment of this invention that displays curve fitting results;

FIG. 12 is a pictorial representation of a display generated by a second embodiment of this invention;

FIG. 13 is a pictorial representation of a display of legends which explain the relevance of the color coded tiles of a second embodiment of this invention;

Figure 15:
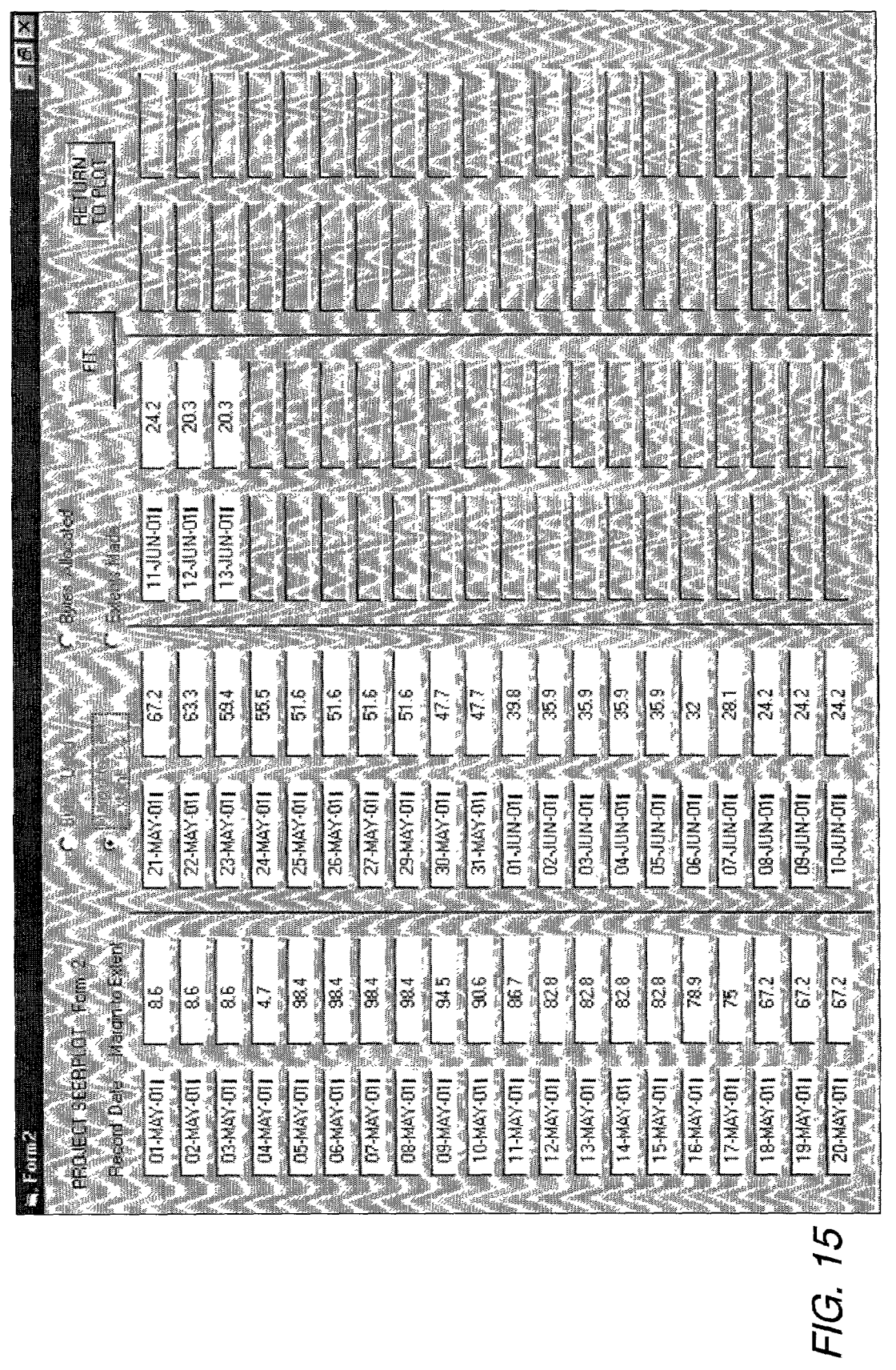

FIG. 15 is a pictorial representation of a display of the coordinates for time history plot of FIG. 14;

DESCRIPTION OF THE PREFERRED EMBODIMENT

Figure 1:
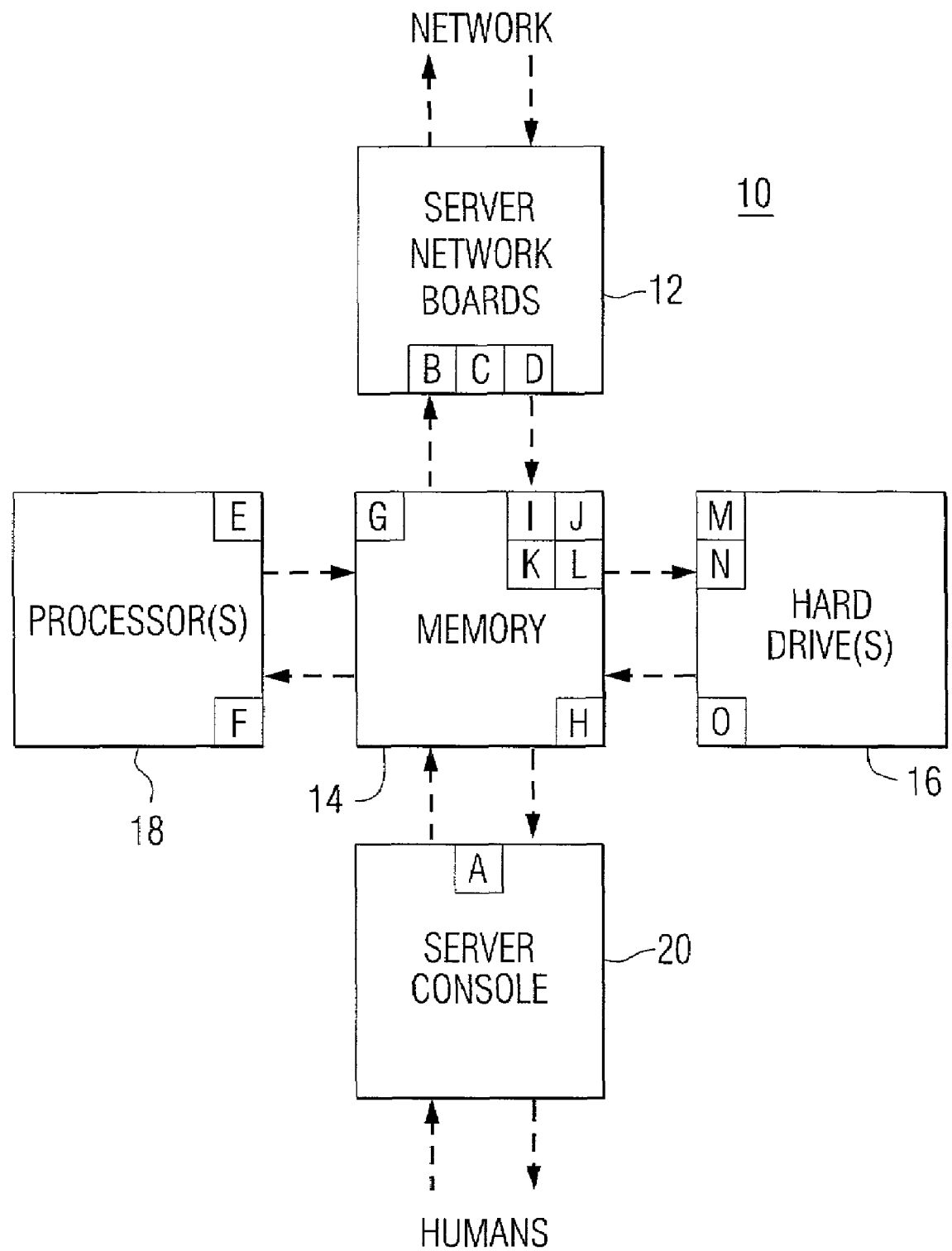
FIG. 1 is a block diagram representation of the components of this invention.

By way of example, one preferred embodiment of this invention is described as applied to the process represented by a typical group of servers (central computers) on a Local Area Network (LAN). Commercially available products, of which the Transcend Enterprise Manager offered for sale by 3Com Corporation, 5400 Bayfront Plaza, Santa Clara, Calif., is typical, serve to monitor the more diffuse aspects of the Local Area Network. The preferred embodiment set forth hereafter focuses on displaying the condition of vital signs of the process at the server level. The basic components of one such server are conceptually illustrated by the block diagrams illustrated in FIG. 1 which provide indications of the sources of certain operational parameters of interest. As illustrated in FIG. 1, each server 10 provides data to and receives data from the network through server network boards 12 that communicate with the memory 14 in a bi-directional manner. In turn, the server memory 14 provides information to and receives information from the hard drives 16 and processors 18 and provides information to and receives direction from the server console 30, which interfaces with the operator. In order to contrast the display of this invention with prior practice, reference is made to an exemplary data collection worksheet illustrated in FIG. 2. This worksheet was developed from a manufacturer's guideline for periodic manual collection of "vital sign" data, on a server by server basis, for subsequent review by a system analyst. In this example, the respective circled upper case letters at the right end of certain of the rows on the data collection worksheet reflect the boxed letters in FIG. 1, and identify parameters considered to be of particular interest in assessing server health. A description of the actual parameters and their relevance is described hereafter.

The bulk of the entries are evident to one of ordinary skill in the art. One may note, however, that in addition to the daily record columns 22, one column 24 on the left, titled REF and two columns 26 and 28 on the right are provided to contain summaries of the results of rudimentary data processing that is done to refine the raw data. For the rate-associated parameters, C, D, E, H, K, and L, the values of the average rates of change of the parameters, calculated by linear regression, appear in the summary spaces, together with their regression coefficient values and the results of comparison with the corresponding rate of change values of the preceding week. For the other parameters, either the average or the maximum values, as appropriate, are entered in the summary spaces together with the results of comparison of the values either with predefined limiting values or with the corresponding values from the previous week. For convenience, the limiting values and the preceding week's results are listed in the REF column 24 on the left.

In one preferred embodiment of the invention, data collection and preliminary processing are carried out fully automatically by dedicated software capable of accessing the appropriate data files in the server. In some cases, the software tools for automatic data collection already exist and are commercially available as in, for example, the NETBASIC package available from High Technology Software Corporation, 3370 N. Hayden Road, Scottsdale, Ariz. In other cases, the necessary software can readily be provided by the vendors of the various server configurations commonly in use in the industry.

Data processing takes two general forms:
1) Comparison of observed values of monitored parameters against preset limits. When a preset limit is exceeded by a parameter's current value, a flag is set to signal that a change is to be made in the associated field in the output display. In the preferred embodiment of the invention, high and low dead-bands are applied to each preset limit to minimize flutter in the display when the parameter value hovers in the immediate vicinity of a preset limit.
2) Identification of changes in the values of nominally stationary parameters and of changes in the rate of change of monotonically increasing or decreasing parameter values. Changes in value or in rates of change of values are conveniently detected by curve fitting and pattern recognition techniques applied to recent chronological records of observed parameter values.

Development and implementation of the necessary data processing software for a specific application is well within the capabilities of data analysts and programmers of ordinary skill in the art.

Thus, it is relatively simple, using currently available techniques and tools, to continuously monitor online a group of servers that are linked together to form the nucleus of a local area network and to generate a tabulation of numerical values of "vital sign" information suitable for periodically generating either a printed summary or a computer terminal tabular display of the general form illustrated in FIG. 3. However, as becomes evident from a study of FIG. 3, were the generation of a tabulation of summarized "vital sign" information either on paper or on a computer terminal screen, the endpoint of the data collection and processing activity, a definite risk would exist that potentially critical information would escape the notice of even a well trained specialist in LAN operation, let alone that of a less well trained or a less experienced person.

Figure 4:
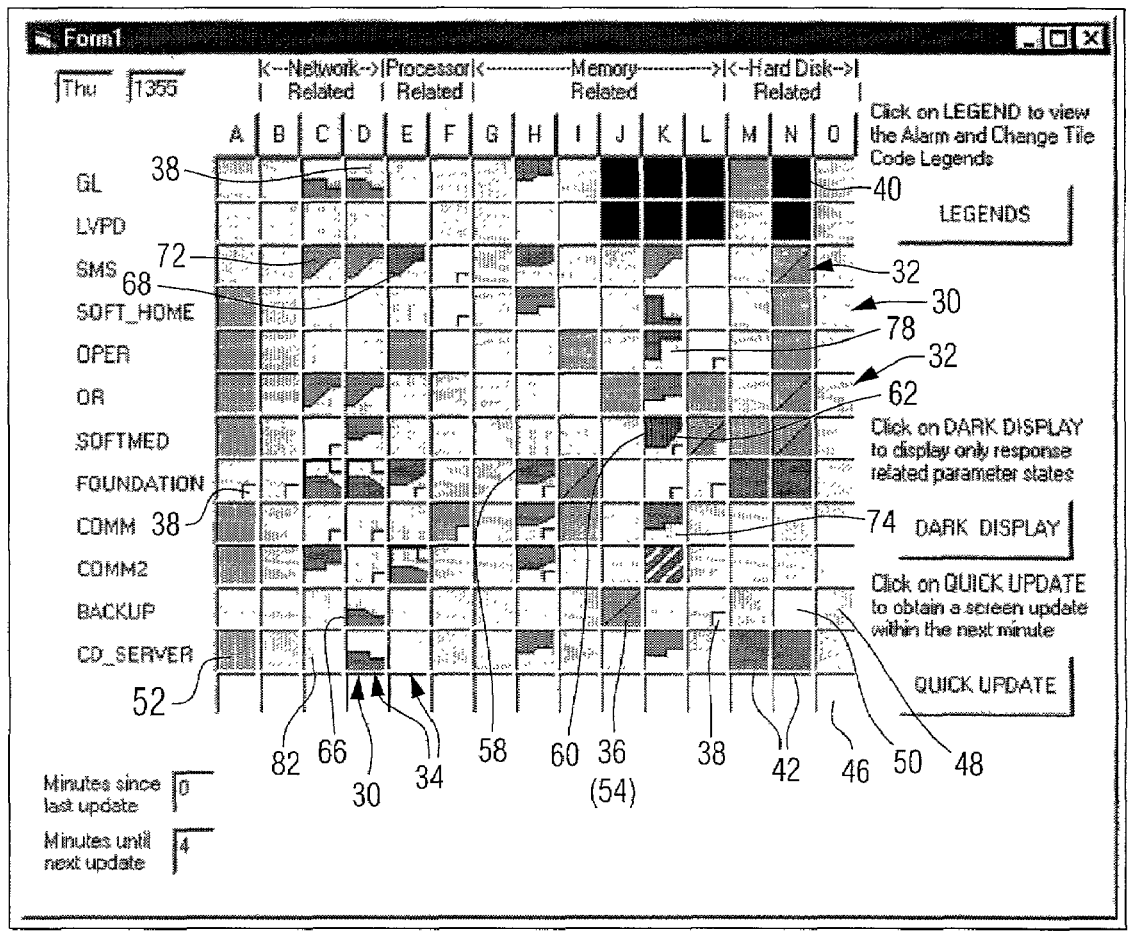
FIG. 4 is a pictorial representation of a vital signs display generated by one embodiment of this invention.

To address the foregoing problem, this invention provides a scheme for presenting the summarized "vital sign" information in a color and geometric shape coded visual display on a computer terminal that not only displays the basic information, but also imparts a great deal more knowledge about the operation of the system, that is easily assimilated by an operator. The display utilizes the basic format illustrated in FIG. 4. FIG. 4 takes the same information presented in the spreadsheet of FIG. 3, organized in the same manner and presents it in a manner that is more readily assimilated by an operator. In FIG. 4, the numerical values shown in FIG. 3 have been classified according to a set of pre-established rules, and the results of the classification process have been encoded by means of a set of selected colors and geometric shapes that are mapped into rectangular spatial fields at pre-selected locations in the display. For convenience, the individual rectangular display fields will be referred to as "tiles" 30 in the following description.

Within the set of tiles 30, two basic types can be distinguished. A number of tiles 32 are characterized by fields of solid color, preferably green, yellow, orange, and red plus a diagonally separated red-orange combination. The remainder of the tiles 34 are all characterized by, preferably, light blue backgrounds on which may be superimposed selectively shaped fields of a darker blue color, or in special cases, red. While the color and geometric coding of the two different tile formats 32 and 34 can be changed without departing from the intent of the invention, it is believed that the benefits of the color coding and patterns chosen will be appreciated from the following description of the significance of each of the two basic visual formats 32 and 34 of the tiles 30 in this embodiment.

The green, yellow, orange, red-orange, and red tiles 32 are associated with those "vital sign" parameters whose monitored values can be indicative of actual or pending component failure. In keeping with a commonly recognized convention, the appearance of a green tile at a location in the array corresponding to a given "vital sign" indicator for a given server informs the human viewer that the numerical value of that parameter for that server is within normal operating limits. The appearance of a yellow tile warns that the parameter value is outside normal operating limits, but the deviation has not reached a level at which a discernable threat of failure exists. An orange tile indicates that the corresponding parameter value is well outside its acceptable range and that component failure or malfunction may be pending. Both a solid red tile and a combination red-orange tile represent definite alarm states in which component malfunction or failure either has occurred or can be expected. The distinction between solid red tiles and red-orange combination tiles referred to in FIG. 4 by reference character 36, arises from the fact that the limiting values for certain of the parameters are true physical limits (as indicated by the solid red tiles), while for other parameters the limiting values are, in fact, administrative limits (indicated by the red-orange combination tiles) and so have a slightly lower level of priority in terms of mandatory operator response. For convenience, all such tiles 32 will be referred to generically as "alarm tiles".

The light blue tiles 34, with or without the superimposed darker blue or red regions, relate to those "vital sign" parameters whose numerical values of rate of change can be expected to change in time under normal operating conditions, typically as a result of direct or indirect human activities, such as operator inputs. Such changes in themselves are usually considered to pose no threat to component or system integrity. Nonetheless, human operators of the system can derive useful information regarding changes in the operating state of the system by noting both the direction and the qualitative magnitude of these changes as they occur.

Thus, the light blue background color in the tiles 34 is used to distinguish parameters indicative of normal operations-related changes from the previously mentioned alarm indicating parameters. In the spatial convention adopted, in this preferred embodiment, the differing superimposed fields allow the human operator to recognize:

Simple changes in slope in an ongoing trend,
Relatively slow, short term offsets in a trend, and
Rapid, jump-like offsets in a trend.

The operator can gain, at the same time, a perception of the relative magnitudes and directions of the changes in trends. Examples of display patterns for this trend tile format 34 employed in this embodiment are illustrated in FIG. 5b. Tiles in this category are referred to generically in the following description as "change tiles".

In addition to using color and geometric shape to represent the operational state and trends of the operational state of a complex process, an additional feature is provided that places in the lower right or, when necessary, in the upper right corner of each tile a small, square field 38 of yellow outlined in black when the visual format of that tile has changed since the most recent prior update of the display.

A few additional tile visual patterns, not all of which appear in FIG. 4, are provided to meet special needs. A solid black tile 40 at a particular location in the display indicates that the parameter/server combination corresponding to that location is not meaningful due to the characteristics of the server. A solid dark gray tile 42 indicates that data relating to the corresponding parameter/server combination was not available, perhaps due to server outage, for example, at the time of data collection. A gray-light blue diagonally barred tile 44 represents a failed attempt to curve-fit a sequence of historical data for the corresponding parameter/server combination. Such failures typically are the consequence of very large scatter in the historical data. A complete row or column of light gray tiles 46 represents null place holders in the display.

Figure 5A:
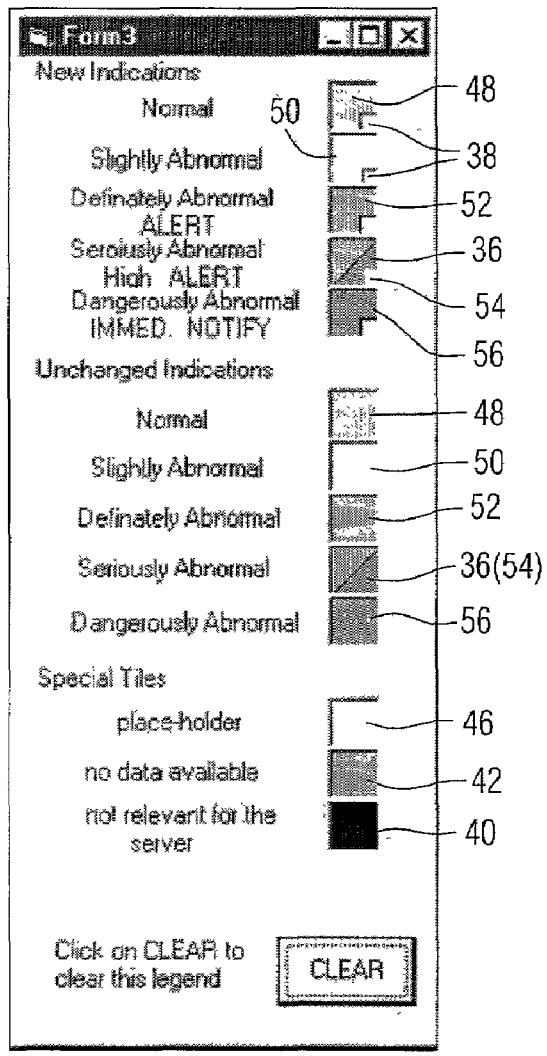
FIG. 5a is a pictorial representation of an alarm tile legend of one embodiment of this invention.
Figure 5B:
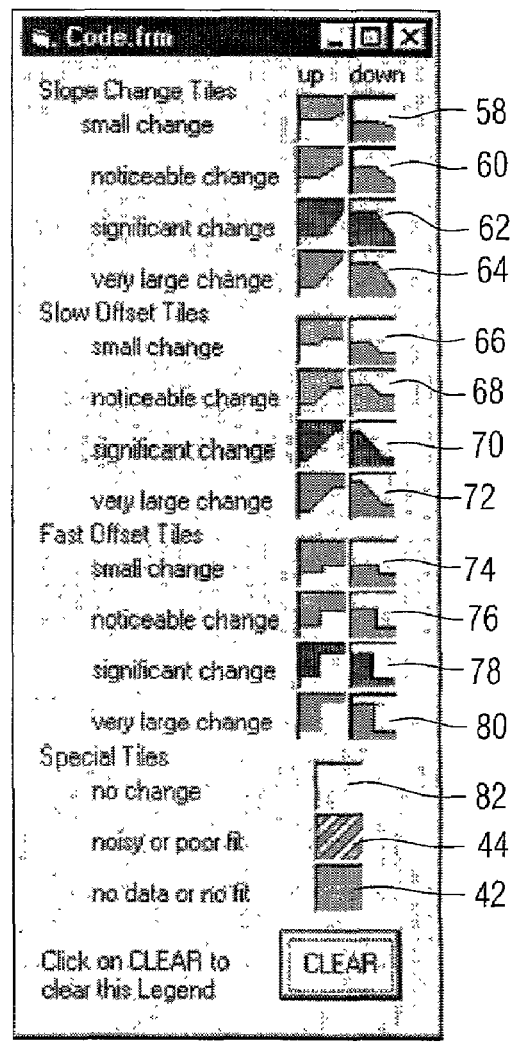
FIG. 5b is a pictorial representation of a change tile legend of one embodiment of this invention.

Legends containing all corresponding recognized visual patterns for alarm tiles 32 are illustrated in FIG. 5a. This legend is available upon request of the operator. The uppermost tile 48 shown in FIG. 5a is a green tile indicating that the operating state of the monitored parameter was normal. The next lower tile 50 is solid yellow indicating that there is a slight abnormality in the operating parameter being represented. The next lowest tile 52 in the legend is orange, indicating that there is a definite abnormality in the monitored parameter and the next lower tile 54 indicates there is a serious abnormality. The last tile in that sequence 56 is solid red, indicating that the parameter is dangerously abnormal. Each of those five fields 48, 50, 52, 54 and 56 illustrated at the top of FIG. 5a are shown with the change field 38 indicating that the parameter has changed in value since the last update. These five fields 48, 50, 52, 54 and 56 are repeated in the center of the legend without the change fields shown. The light gray tile 46, dark gray tile 42 and solid black tile 40 are shown in the lower portion of the legend to identify, respectively, a placeholder, no data available, or that the data for that particular server is not relevant.

A similar legend for the change parameters is shown in FIG. 5b. The change tiles illustrated in FIG. 5b are arranged in three categories. The slope change tiles 58, 60, 62 and 64, respectively, represent a small change, noticeable change, significant change and very large change; slow offset tiles 66, 68, 70 and 72, respectively, represent a small change, noticeable change, significant change and very large change; and fast offset tiles 74, 76, 78 and 80, respectively, represent a small change, noticeable change, significant change and very large change. The display tiles in the left-hand column in FIG. 5b represent changes in the upward direction while the display tiles in the right hand column represent changes in the downward direction. In addition, a solid light blue field illustrated by display tile 82 indicates no meaningful change. Most of the changes shown in the change tile legend illustrated in FIG. 5b are shown in context in FIG. 4 except for display tiles 64, 70, 76 and 80. Display tiles 64, 70 and 76 can be found in context in the illustrated display shown in FIG. 7. Display tiles 42 and 44 were previously described and tile 42 appears in both the alarm tile legend and the change tile legend, respectively illustrated in FIGS. 5a and 5b. Both legends are available for display upon request of the operator.

For a better understanding of the invention as it is applied to a server environment, the preferred "vital sign" parameters selected for display in FIG. 4 are described in the paragraphs that follow. The "vital sign" indicators displayed in FIG. 4 are appropriate for the Novell 4.1 servers considered as representative of many local area networks.

A Uptime—the elapsed time since the server was last restarted.

Certain of the parameters frequently are in an unusually dynamic state in the time period immediately following server restart and are not necessarily indicative of normal operation. After restart, the uptime parameter signals the point in time at which such parameter values can again be considered meaningful as "vital sign" indicators. Furthermore, as uptime approaches and exceeds an administrative upper limit, it points to the need for scheduled maintenance on the server.

B Increase in Check Sum Errors—an indication of an increase in the accumulated count of check sum errors during the most recent display update time interval.

Check sum errors are indicative of faults in the transferring, including sending and receiving, of packets of information on the network.

C Change in Packets Sent Rate and

D Change in Packets Received Rate—indications of changes in the rate at which packets are being sent to, or being received from, the network by the server.

A change in the rate at which packets are being sent or received, or both, by the server may be indicative of a change in the server workload, perhaps as a result of human activities, or of problems in the server network card, in a local segment of the network, or on the network at large.

E Currently Allocated Service Processes—an indication both of the number of service processes currently allocated and of a change in the rate of allocation.

The total number of service processes that can be allocated at any given time is administratively fixed for each server individually. If the requests for service processes exceed the number of processes that can be made available, the server may lock up. In addition, the number of service processes allocated by a server usually remains nearly constant or increases at a nominally constant rate depending on the applications loaded on the server. An abrupt change in number or rate frequently correlates with human intervention, typically by loading new applications on the server.

F "Thread Spinning" Frequency—an indication of the frequency of occurrence of short bursts of processor utilization at near full capacity, followed in each case by a rapid return to a normal level.

Such bursts are frequently associated with activation of service processes. If they occur too frequently, they may result in processor overload.

G Currently Allocated Packet Receive Buffers—an indication of the fraction of available packet receive buffers that is currently allocated.

The total number of packet receive buffers that can be allocated at any one time in a server is administratively fixed. If the number of buffers available for allocation is inadequate to meet the demand for buffers, incoming packets are rejected by the server and may be lost.

H Currently Allocated Directory Cache Buffers—an indication both of the fraction of available directory cache buffers that is currently allocated and of a change in the nominal rate of allocation.

The total number of directory cache buffers that can be allocated at any given time in a server is administratively fixed. If the demand for directory cache buffers exceeds the current limit, the number of buffers available for normal file caching is correspondingly reduced. In addition, the rate at which directory cache buffers are allocated by a server usually remains approximately constant after an initial startup transient. A change in allocation rate is frequently associated with human activity, typically through loading new applications on the server.

I Currently Available Cache Buffers—an indication of the fraction of all cache buffers initially available at server startup that remains available to expedite accessing information normally stored on disk.

If the number of available cache buffers falls below an empirically determined fraction of server memory originally allocated for file caching, degradation of server performance can be expected.

J Cache Hit Frequency—a measure of the likelihood that a wanted piece of information normally stored on hard disk will be found in cache.

The cache hit parameter serves as a warning of potential degradation of server performance caused by the lack of an adequate number of cache buffers available for file caching.

K Change in Cache Buffer Allocation Request Rate—an indication of a change in the rate at which requests are being received for allocation of cache buffers to facilitate accessing information normally stored on hard disk.

A change in the rate at which allocations of cache buffers are being requested can be indicative either of a change in server workload or of a lack of available cache buffers.

L Cache Buffer Allocations Filled by "Least Recently Utilized" Buffers
  the ratio of the rate of cache buffer allocation using L R
    U buffers to the total rate of allocation from all sources.

If a large fraction of all requests for allocation of cache buffers is met by overwriting buffers containing information recently read from disk, low L R U sitting times and decreased cache hit probabilities usually result.

M Current Actual Hard Disk Commitment—the fraction of available hard disk space allotted to the most demanding volume on a server's hard disk that is actually occupied.

If the fraction used of the total hard disk space available to any volume exceeds an empirically determined value, decompression of compressed files in the volume can be expected to be inhibited.

N Current "Fully Decompressed" Hard Disk Requirement—a measure of total hard disk space available to the most demanding volume that would be occupied if all compressed files in that volume were to be simultaneously decompressed.

As the "fully decompressed" space requirement approaches or exceeds the total hard disk space available to the volume, decompression becomes progressively more difficult.

O Apparent Occurrence of Aggressive Sub-allocation—an indication of the occurrence of a prolonged period of very high utilization of a server's processor, possibly resulting from an internal attempt to secure working space in a nearly full volume on a hard disk.

Aggressive sub-allocation severely degrades server performance and can totally block server response.

In this embodiment, several of the "vital sign" parameters of interest can serve as indicators both of normal operational change and of existing or pending component failure or malfunction, depending on the current numerical value of the parameter. Thus, for example, in the preferred embodiment parameter H—Currently Allocated Directory Cache Buffers serves to advise the human operator of changes in the rate of directory cache buffer allocation that occur, for example, when new applications are loaded on the server. Such changes, while of interest, typically represent no threat to the server operations and provoke no operator response. However, should the number of allocated buffers reach the allocation limit, any additional buffers required for directory cache purposes are drawn from the buffer pool used to supply file cache buffers, and file caching becomes compromised. In this event, alarm tile indications become appropriate and supersede the otherwise expected change tile indications until the condition is in some way corrected.

Figure 8:
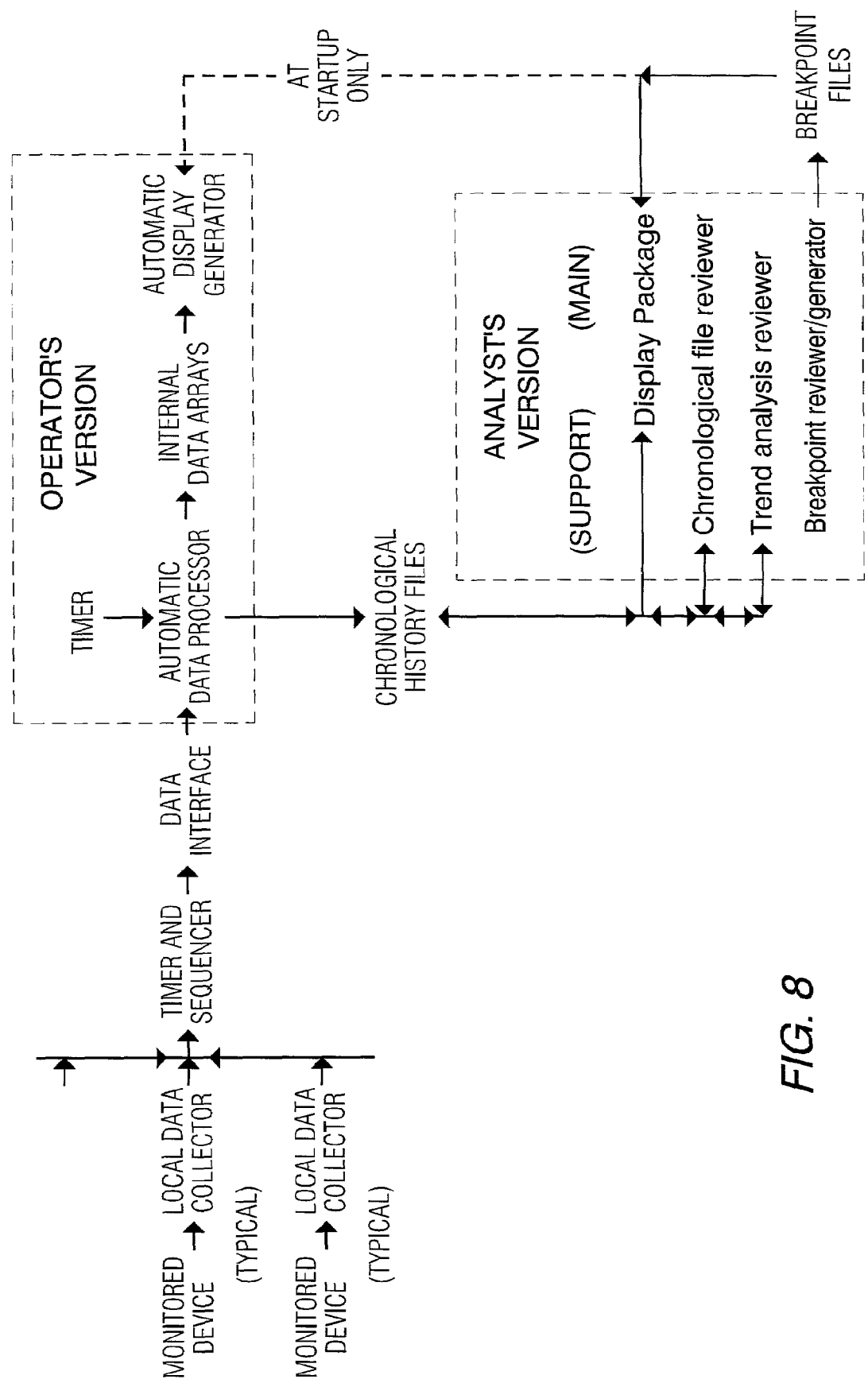
FIG. 8 is a schematic illustration of the general flow of data of a preferred embodiment of the invention.

The actual automated data processing sequence for a given server in this preferred embodiment of the invention is laid out in FIG. 8 as follows:

1) The specified parameter values are collected by means of a commercially available monitor at regularly scheduled intervals, for example, every thirty minutes.

2) The new data set is inserted into a chronological stack in which at each time step the oldest data set at the bottom of the stack is discarded, each remaining data set is shifted down one level in the stack, and the newest data set is inserted at the top. When the newest data set has been loaded in the stack, the trigger for the next data collection is set, and control is passed to the processor.

3) In the processor the respective parameters are treated in turn:
  a) First, the current value of the parameter is tested to determine whether that value lies outside of its expected normal operations band. If the current value is above the maximum desirable limit or below the minimum desirable limit, the magnitude of its deviation outside the band is classified according to the relevant rules and the results of the classification are used to select the appropriate alarm tile visual format to be displayed at the display location corresponding to the parameter and server of immediate interest.
  b) If the current value of the parameter falls within the desirable range, the parameter type is tested by comparison with a predetermined list to determine whether its current and recent values should be processed to extract possible change in trend information.
  c) If change in trend information is wanted, the available set of chronologically arranged values of the parameter is passed through a curve fitting algorithm to determine the type, magnitude, and timing of any recognizable deviation from the expected data trend and the statistical confidence associated with that determination. If a noticeable deviation in recent parameter values from the expected trend is detected, the type, direction and magnitude of change are classified and the results of the classification are used to select the appropriate change tile visual format to be displayed at the display location corresponding to the parameter and server of immediate interest.

The curve-fitting algorithm used in the preferred embodiment of the invention is of the general form:

$$\sum_{n=1}^{N} w_n \{a + bx_n + cg(x_n - x_{ref}) + df_j^k(x_n) - y_n\}^2 \Rightarrow \text{Min} \quad (1)$$

where the approach is one of least squares fitting with:
N, the total number of data samples available
$y_n$, the value of the n-th such data sample
$x_n$, the corresponding relative or actual time value, and
$w_n$, an optional weighting factor that can be used to discount the influence of "old" data points and emphasize recent data behavior.

The coefficients a and b are seen to correspond to the intercept and slope of conventional linear regression.

The function g $(x_n-x_{ref})$ is a simple notch function keyed to a particular point in actual clock time, such as the beginning of the lunch hour or the end of the workday on Friday. If, for example, the g function is used to account for a routinely observed decrease in network traffic, and therefore the packets sent and received rates, between 1200 hours and 1300 hours each workday, the function might take the form:

$$g = 0, \text{ for } (x_n - 1200) < 0.0$$
$$g = 1, \text{ for } 0 <= (x_n - 1200) <= 100$$
$$g = 0, \text{ for } (x_n - 1200) > 100$$

where $x_n$ refers to the local clock time when the n-th sample of the parameter of interest was taken.

The coefficient c then measures the change in, for example, the average packets sent or packets received rate that occurs over the lunch hour. In the hypothesized example the coefficient would be expected to be negative, reflecting a decrease in activity.

The function $f_j^k(x_n)$ in this formulation is actually two nested families of functions, each conceptually similar to the $g(x_n-x_{ref})$ function, but not keyed to any fixed point in time and not modeling any specific, predictable characteristic of the temporal behavior of the parameter being examined. The subscript j identifies the type or shape of the function, for example, a simple step or jump, or a change in slope. The superscript k identifies the point in time, relative to the oldest point in the data set being processed, at which the first departure from an initial null value for the function occurs. The coefficient d then specifies the magnitude associated with the function $f_j^k$, and typically assumes a different value for each combination of the indices j and k considered.

In application the data processing procedure, applied to a set of data corresponding to the recent history of a given parameter for a given server, automatically selects in turn each combination of j and k values, and for each combination:

a) evaluates the four fitting coefficients, a through d, that result in the minimum value of the variance, i.e., the sum of the squared difference between the postulated fitted value of the parameter and the actual observed value for all observations, and b) stores the values of the four coefficients, the two indices j and k, and the resultant variance in a lookup table.

When all combinations of the j and k indices have been processed, the table is examined to identify the minimum value of variance obtained, and the corresponding values of the four fitting coefficients and the two indices are reported as being those that best characterize the data set being considered. In particular, the values of the indices j and k and the coefficient d can be interpreted to reveal:

1) what kind of change in parameter trend occurred during the period of observation (subscript j)
2) when during the period of observation the change in trend first became detectable (superscript k)
3) what the magnitude and direction of the detected change was (coefficient d).

The magnitude of the variance corresponding to the best fit provides the desired measure of the statistical confidence that can be associated with the determination of the nature, timing and magnitude of an indicated change in trend.

One of ordinary skill in the art of curve fitting will recognize the simplicity of the methodology and will appreciate that the procedure can be extended to identify the "second best" fit and so on. If the fitting procedure is extended, as suggested, to identify the components of the "second best" fit, additional insight into the validity of the indication of a change in trend can be gained. Thus, if the $f_j^k$ functions of the "best" and "second best" fits, respectively, are closely similar and the two variances are comparable in magnitude, the indicated change in trend probably closely approaches reality. If the characteristics of the two $f_j^k$ functions are dissimilar and the variances are of different large magnitudes, the indicated change in trend is clearly suspect.

The methods developed for assigning parameter range boundary values, i.e., —the numerical values at the separation points of the successive regions of increasing severity of parameter departures from their normal states, follows. In the case of alarm tiles it has proved to be sufficient to accept manufacturer's guide lines as worst state lower boundaries and on that basis to select, on purely empirical grounds, set points for the transitions among states of lower severity. Since all of the servers of interest on the local network in this embodiment are of the same basic type it has proved to be acceptable to apply one set of alarm set point values for each parameter to all servers. However, providing customized alarm set points for individual servers would pose no significant implementation problems. The assignment of sets of setpoint values for the change-related parameters requires more consideration.

In principle, the change tiles address time-related changes in operational characteristics of the several servers. The operational characteristics are, in turn, heavily influenced by the specific applications running on each individual server. To cope with this complexity the concept was introduced of extracting statistical "standard error of estimate" values from the results of applying curve fitting to a large number of recorded time histories for each of the change-related parameters for each server. For any given time history set, l, of parameter values, the "standard error of estimate" value is obtained by evaluating the expression $$\left.\frac{\text{standard error}}{\text{of estimate}}\right|_l = \sqrt{\frac{\text{variance}_l}{N_l - 4}} \quad (2)$$

where $N_l$ is the number of data points in the l-th data set (reducing the value of N by 4 accounts for the loss of degrees of freedom in the fitting process used here)

and the variance $|_l$ is given, in turn, by $$\text{variance}|_l = \sum_{n=1}^{N_l} \{a + bx_n + cg(x_n - x_{ref}) + df_l^k(x_n) - y_n\}^2 \quad (3)$$

with the individual variables and functions as defined above.

The combination of values of the indices j and k is that which yields the smallest value of variance for the set of data points fitted.

With the set of "standard error of estimate" values in hand, out-lyers resulting from particularly poor fits are discarded, and from the remainder a mean value is obtained by a statistical averaging process. This mean value is referred to here as the "reference standard error". From its derivation it can be seen that it tends to characterize the magnitude of the random fluctuations ("noise") in an average fitted time history of the values of the specified parameter with the specified server running a typical (for that server) set of applications. By periodically re-computing the "reference standard error" value for a given parameter/server combination, shifts in the value caused by, for example, a change in the mix of applications running on the server can be detected, and the value of the "reference standard error" stored for use in the display program can be updated to match current conditions. Obviously, the entire periodic re-evaluation and updating of the full "reference standard error" library currently in use at any time can be carried out automatically with straightforward programming techniques.

Independently, a set of multipliers common to all servers is empirically selected for each parameter such that the products of these multipliers and the server specific "reference standard error" values serve as the set of set points actually used to distinguish the several ranges of magnitudes of changes for each parameter/server combination illustrated in FIG. 5b. More specifically, in this preferred embodiment, we calculate the set-point values that separate "small", "noticeable", "significant" and "very large" changes in trend using the relation:

Set Point$_{p'q'r}$=$M_{p'q}$*Reference Standard Error$_{p'r'}$ where "p" signifies the parameter of interest,
where "q" signifies the range among "small", "noticeable", "significant" and "very large" changes,
where r signifies the server of interest,
where M is an empirically pre-selected multiplier that, at least in this application, is the same for all servers, and
where Reference Standard Error is as described above and depends on what set of applications is running on the server of interest.

With this formulation, the set-point values reflect the intrinsic scatter that arises in fitting successive sets of historical values of parameter p recorded when server r is running its current set of applications.

The goal is to correlate the values of the set-points with the scatter in the data. We are in effect saying, "Classify the most recent determination of a detected change in trend as 'small' if its magnitude lies between, for example, 0.5 and 1.5 average standard errors of estimate, as 'noticeable' if its magnitude is between 1.5 and 3.0 average standard errors of estimate, and so on. In this example, the 0.5, 1.5 and 3.0 numbers are values of the empirically pre-selected nominally fixed multipliers.

The benefit of this approach is that it allows the use of a set of change tile set point values for each parameter/server combination that internally incorporates a statistical characterization of each server/application set combination. As noted, the set-point set can be adjusted (automatically, if appropriate), following an analytically based procedure that utilizes the results of an updated average standard error of estimate calculation to account for changes in the mix of applications running on the server. Further, it provides each parameter/server combination a statistically derived reference value against which to test the results of curve fitting to individual time history data sets to assess the probable validity of the results of the fit and of the change tile visual format selected on the basis of the fit results.

It should be noted that the structuring of the actual rules for sorting observed or derived parameter values into classes prior to encoding the results into colors and geometric shapes is well within the programming art. Examples of rule construction are to be found readily in the extensive Artificial Intelligence literature. Derivation of specific rules supporting a given application of the invention is well within the capabilities of a person of ordinary skill in the field of that application.

This preferred embodiment of the invention comprises three distinct display modes, implemented fully or in part in two partially coupled versions of the overall concept. The three display modes will be referred to as
    the SNAPSHOT mode,
    the DARK DISPLAY mode, and
    the SERVER HISTORY mode.

The displays in all three modes are constructed from the catalog of alarm, change and special tiles described earlier. In all three each one of the columns of the display matrix is dedicated to one of the parameters from the set A through O described previously. The display modes differ in that:

The SNAPSHOT mode presents the full set of "vital sign" indications for all of the servers of interest at a common point in time. FIG. 4 is an example of a display in the SHAPSHOT mode.

Figure 6:
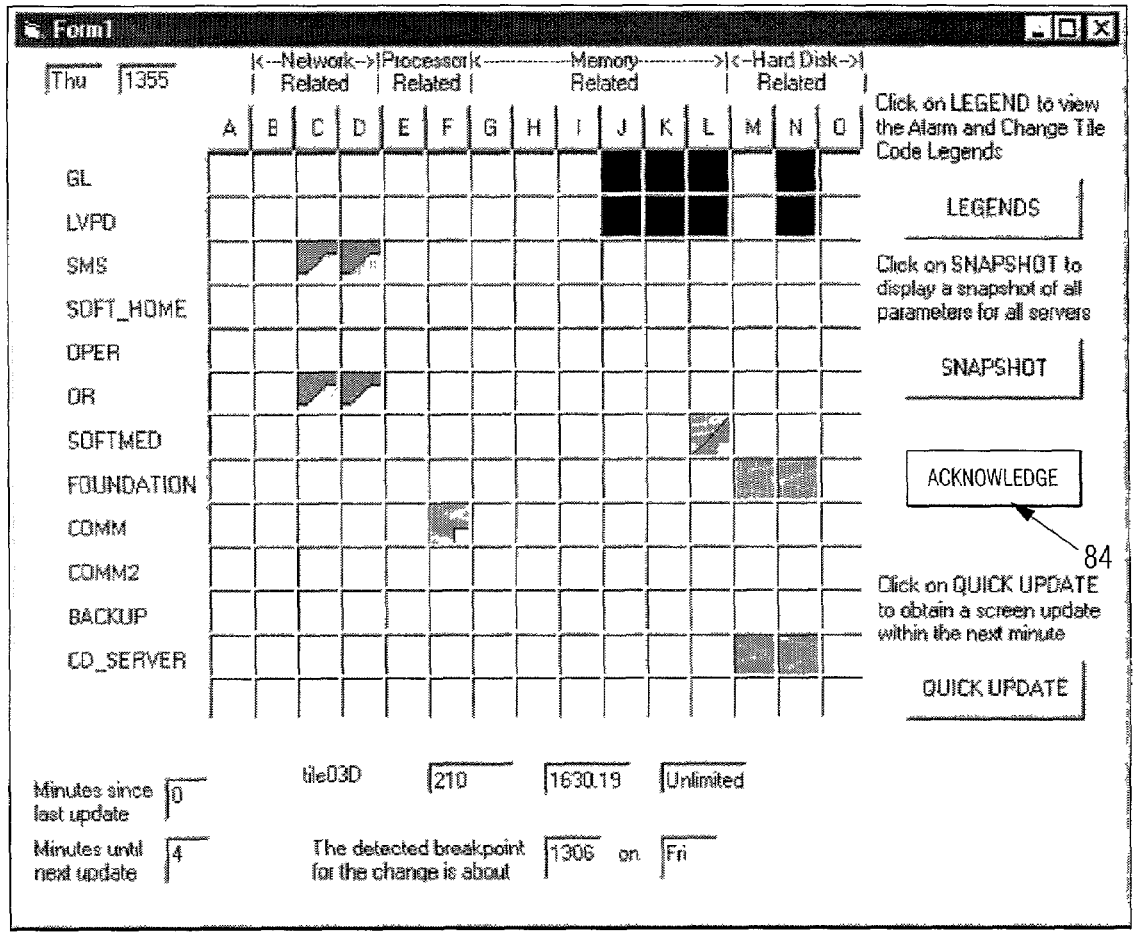
FIG. 6 is a pictorial representation of one mode of display of an embodiment of this invention characterized as an operator's version Dark Display.

The DARK DISPLAY mode presents only those "vital sign" indications that represent "bad and worsening" conditions in the servers of interest, again at a common point in time. By "bad and worsening" conditions is meant conditions that have progressed in severity from a lower state to the orange, red-orange or red state for alarm tiles or to the red-light blue/increasing state for change tiles since the most recent prior update of the display. Indications at these levels specifically demand active operator response. FIG. 6 shows a typical DARK DISPLAY mode screen.

Figure 7:
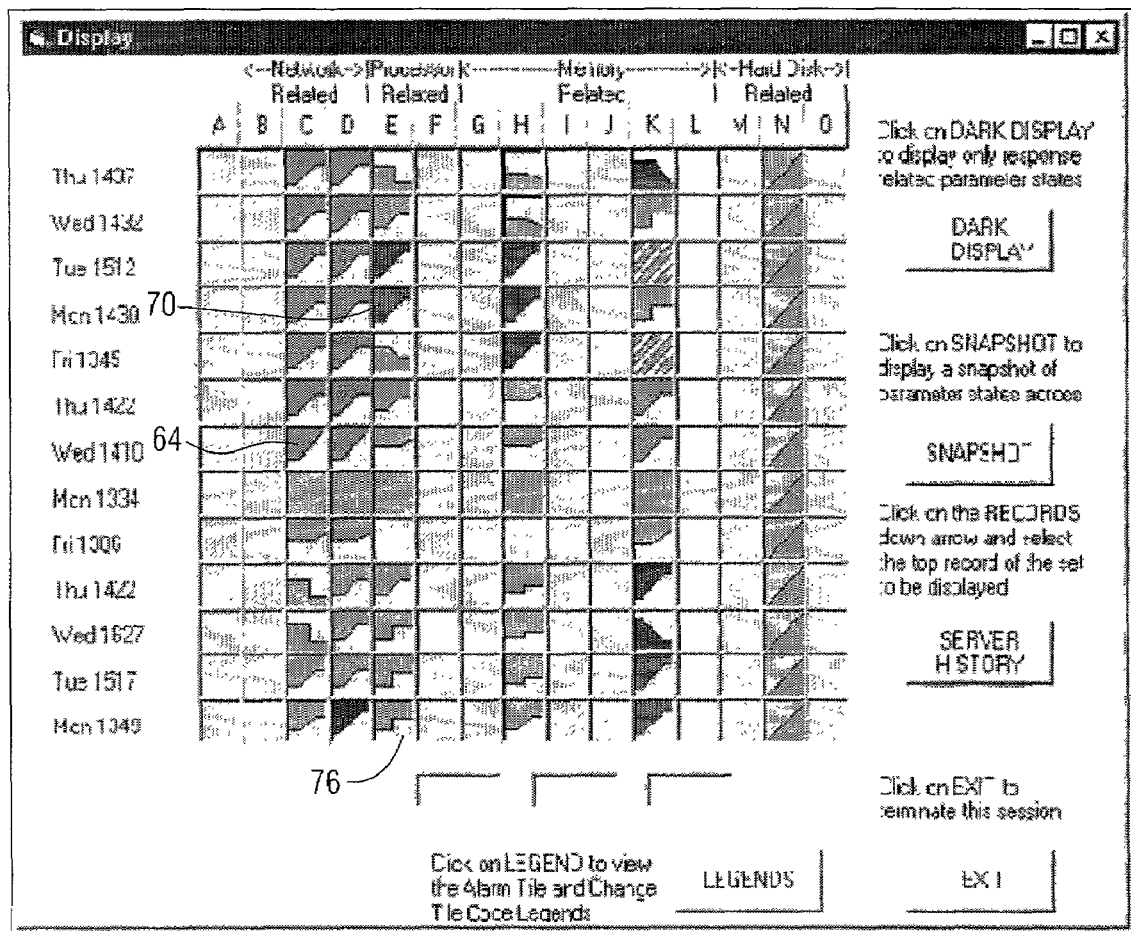
FIG. 7 is a pictorial representation of another mode of display of this invention in an analyst's version identifying the monitored parameter's recent history.

The SERVER HISTORY mode shows the full set of "vital sign" indications for one selected server at successive points in time over an interval of time in the past. FIG. 7 is illustrative of a SERVER HISTORY mode display.

This embodiment provides for at least two versions of the display concept of this invention. One version is directed toward use by facility operators; the other is intended for use by the facility's analysts (or other specialists, i.e., engineers, etc.). FIG. 8 shows the general arrangement of the dual system.

The operator's version is a fully automatic process running in real time from a compiled execution file. Its functions are:

1) to periodically collect "vital sign" data from an interface supported by software that automatically accesses the respective monitored devices and copies selected data to the interface;
2) to process the collected data to extract system state information, which is supplied both to internal data arrays and to external chronological files;
3) to classify the current time data array information into visual formats for the set of display tiles in the operator's main display according to the selected display mode; and
4) to respond to operator acknowledgements, when appropriate, and to operator requests for tutorial and legend overlays.

The operator's version has accessible only the DARK DISPLAY mode, by default at each update, and the SNAPSHOT mode, at operator request between updates. In both modes, only information relating to the current state or the most recent history of the various parameters for each server is available. All boundary set points and reference standard error values are supplied from an external source when the executable code is first actuated.

In general, updating of the operator's display takes place automatically at preset time intervals, typically every thirty minutes. However, it is anticipated that under some circumstances a manually initiated screen update, independent of the preset automatic update schedule, may serve a useful function. Accordingly, a QUICK UPDATE command button has been provided on the operator's display screen. By clicking on QUICK UPDATE the operator can trigger an "immediate" (e.g., within sixty seconds) update of the display in DARK DISPLAY mode using the most recently collected set of "vital sign" data from the monitored servers. In order for this QUICK UPDATE capability to be effective the raw data collection process must run as an independent task with a cycle time significantly shorter than the display function task using, for example, a file accessible by both tasks as an information interface. In order to preserve the integrity of the external chronological files and of the internal data arrays generated and used by various components of the invention, all data introduced into the system by a QUICK UPDATE is discarded upon completion of the manually initiated screen update.

The system analyst's version of the invention is a totally manual, off-line process recompiled from source code each time it is activated. It is intended to be used as a system state evaluation tool and as a vehicle for reviewing and, as necessary, revising the chronological history files, the boundary set point and reference standard error files, and the actual tile visual format selection logics. The analyst's version consists of a suite of four source codes, only one of which can be active at any given time. Of the four source codes three are support packages, which allow the analyst:
1) to review and revise the chronological history files or create new chronological files to simulate hypothetical scenarios for testing display validity and for training purposes;
2) to review the results of trend analyses or rerun the curve fitting algorithms to observe details of trend analysis of real or hypothesized chronological histories of parameter behavior; and
3) to review and revise the boundary and reference standard error files.

The main display package allows the analyst to generate a main display screen, complete with tutorial, legend, and supplementary information overlays, that is nominally identical to the operator's display. However, the analyst's version can also operate in the SERVER HISTORY mode described earlier, and can display in any of the three modes not only current information but also earlier information available in the chronological history file records.

Since the analyst's display package is in source code form the analyst can readily use it to develop and test improved tile visual format selection algorithms or to test proposed boundary set point and reference standard error values that are intended to make the main display more indicative of, and more sensitive to, changes in server "vital signs".

Several secondary aspects of this preferred embodiment that have not so far been described were alluded to above. Prominent among these are the Acknowledge function, the Tutorial overlays, and the Supplementary Information resource.

The Acknowledge function provides a capability in the operator's version for the operator to formally acknowledge that he or she is aware that at least one new "bad and worsening" condition has been detected since the most recent prior update of the display. If, in the current display update in the DARK DISPLAY mode at least one active (i.e., orange or red colored or partially red colored) tile appears as shown in FIG. 6, ACKNOWLEDGE button 84 appears as well. If the operator clicks on ACKNOWLEDGE, the display is in effect, reset, although the only change seen is the disappearance of the ACKNOWLEDGE button. When the ACKNOWLEDGE button is clicked, the software logs internally the date and time of the click, and stores a condensed form of the information displayed at that time. If the operator fails to click on the ACKNOWLEDGE button before the next display update, at the next update in the DARK DISPLAY mode there appears on the screen not only any new "bad and worsening" tiles but also all old "bad and worsening" tiles, without the yellow, "new" fields, that existed at the most recent prior update. The software can also log an operator s failure to specifically acknowledge the earlier appearance of the then new "bad and worsening" indicators.

In accordance with another preferred feature of this embodiment, the operator can click on any one of the parameter column headings and thereby open a "tutorial" window appropriate to the parameter of the selected column. The text displayed in the window contains, in each case:
1) a brief description of the parameter and of its relevance in assessing the health of a server;
2) an indication of possible sources of various observable changes in parameter value;
3) an indication of the significance of the several tile visual formats that can appear in the selected column; and
4) brief response procedures to be carried out by the operator, should particular tile visual formats appear in the selected column.

Figure 9B:
FIG. 9b is a pictorial representation of a typical "tutorial" window of the display of an embodiment of this invention with highlighted text.
Figure 9A:
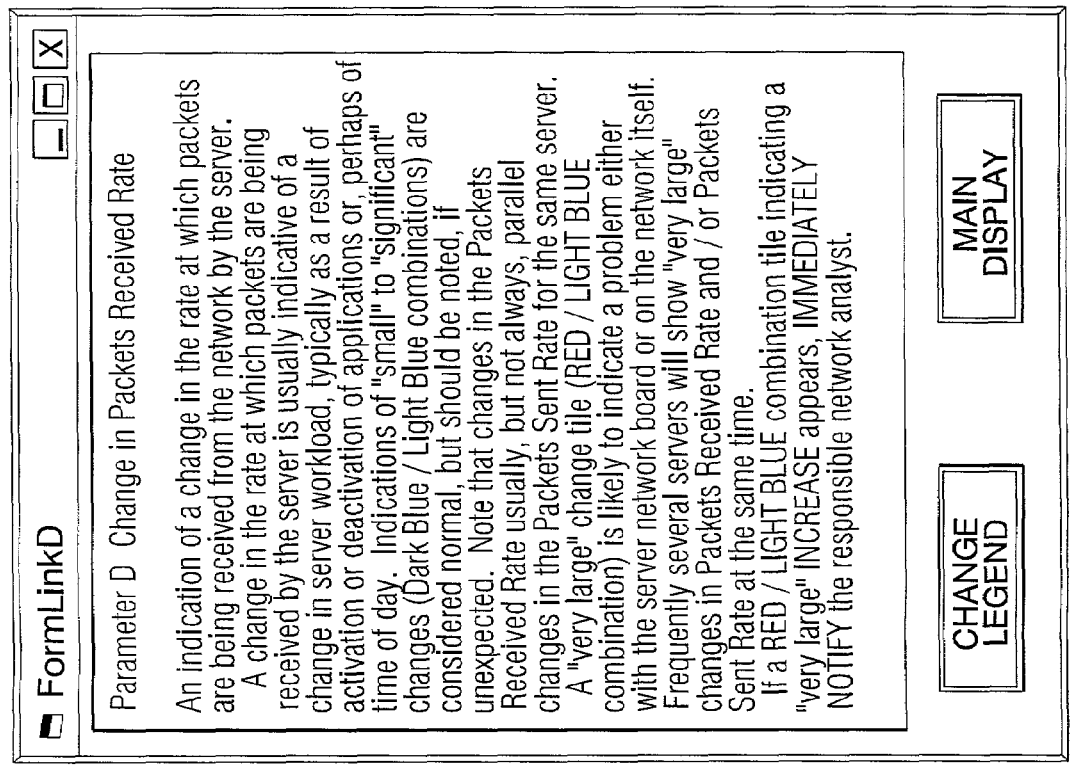
FIG. 9a is a pictorial representation of a typical "tutorial" window of the display of this invention.

An example of one such "tutorial window is shown in FIG. 9*a*. In addition to text, where appropriate, i.e., in columns in which change tiles can appear, the tutorial overlay contains a control that, when activated by a click, reveals a detailed legend similar to FIG. 5*b*. If the tutorial overlay is such that alarm tiles can appear in the corresponding column, a matching control for presenting a legend similar to FIG. 5*a* is provided. If the current display is in DARK DISPLAY mode when a tutorial overlay is requested, and if there is at least one "bad and worsening" indication in the column corresponding to the tutorial, the appropriate operator response paragraph in the text of the tutorial is highlighted in a color consistent with the level of the worst "bad and worsening" indication in the column. The highlighting in color is intended to reinforce the operator's perception of the priority of the action dictated by the text. FIG. 9*b* figuratively shows an example of such highlighting as bold print.

To supply additional support to the analyst charged with evaluating indicated threats to the system being monitored and unusual perturbations in its operation, a capability has been introduced in the analyst's version that allows the analyst to click on any desired tile location and reveal further information regarding the selection of the displayed tile format. In the case of alarm tiles the additional information takes the form of three laterally adjacent fields at the bottom on the main display in which the numerical value of the parameter in question appears in the middle field, flanked by the next lower and the next higher boundary set point values. By comparing the parameter value with the bounding set point values the analyst can easily determine where the parameter stands in the indicated range. Clicking on a change tile opens a window of the form of FIG. 10 where details of the results of the best curve fit used in selecting the displayed change tile visual format are shown, together with the results of the "next best" fit. The significance of the several coefficients whose values appear was discussed above in connection with the curve fitting function. Of particular interest is the quantity displayed in the "(s) overall fit error" field in the "Best Fit" column and the quantity in the "reference standard error" field. Comparison of the "overall fit error" value with the "reference standard error" value gives a direct indication of the statistical validity of the information derived from curve fitting. If, for example, the "overall fit error" value is significantly (several times) larger than the "reference standard error" value, the results of the fit and therefore the extent to which the displayed tile format may be meaningful, are suspect. As an alternative, a direct, visual, qualitative comparison of the results of the best fit with the input data is provided by the plot to the right of the tabulated results, as shown in FIG. 10.

In the operator's version, the Supplemental Information resource is activated by clicking on selected tile locations as in the analyst's version, but the actual information presented is limited to parameter versus range comparisons for alarm tiles and identifications of the dates and times at which the breaks in trend indicated by change tiles appear to have occurred.

Figure 11A:
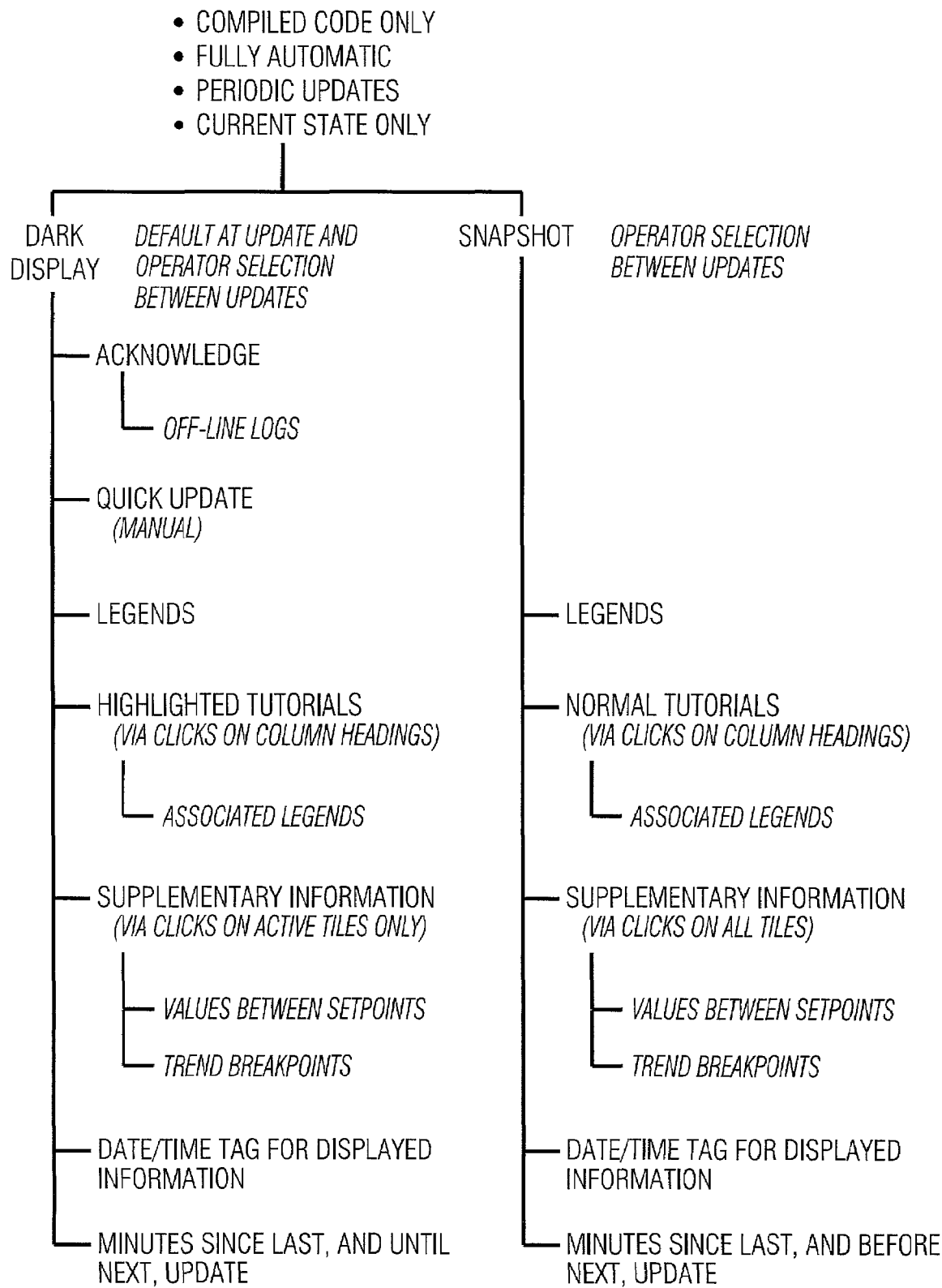
FIG. 11a is a flow diagram identifying significant attributes of the main display of one version of this invention.
Figure 11B:
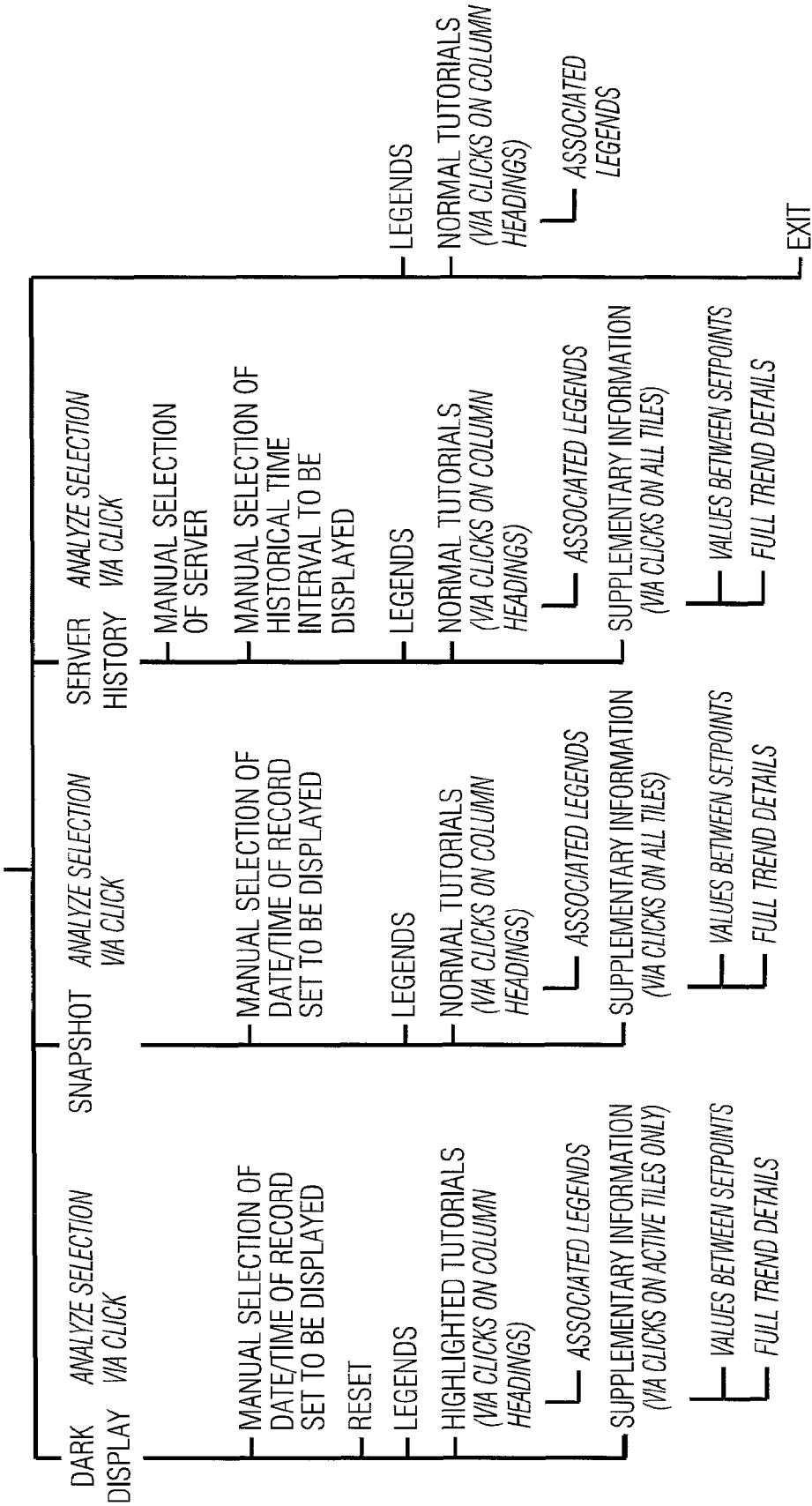
FIG. 11b illustrates a flow diagram showing significant attributes of the main display of a second version of this invention.
Figure 14:
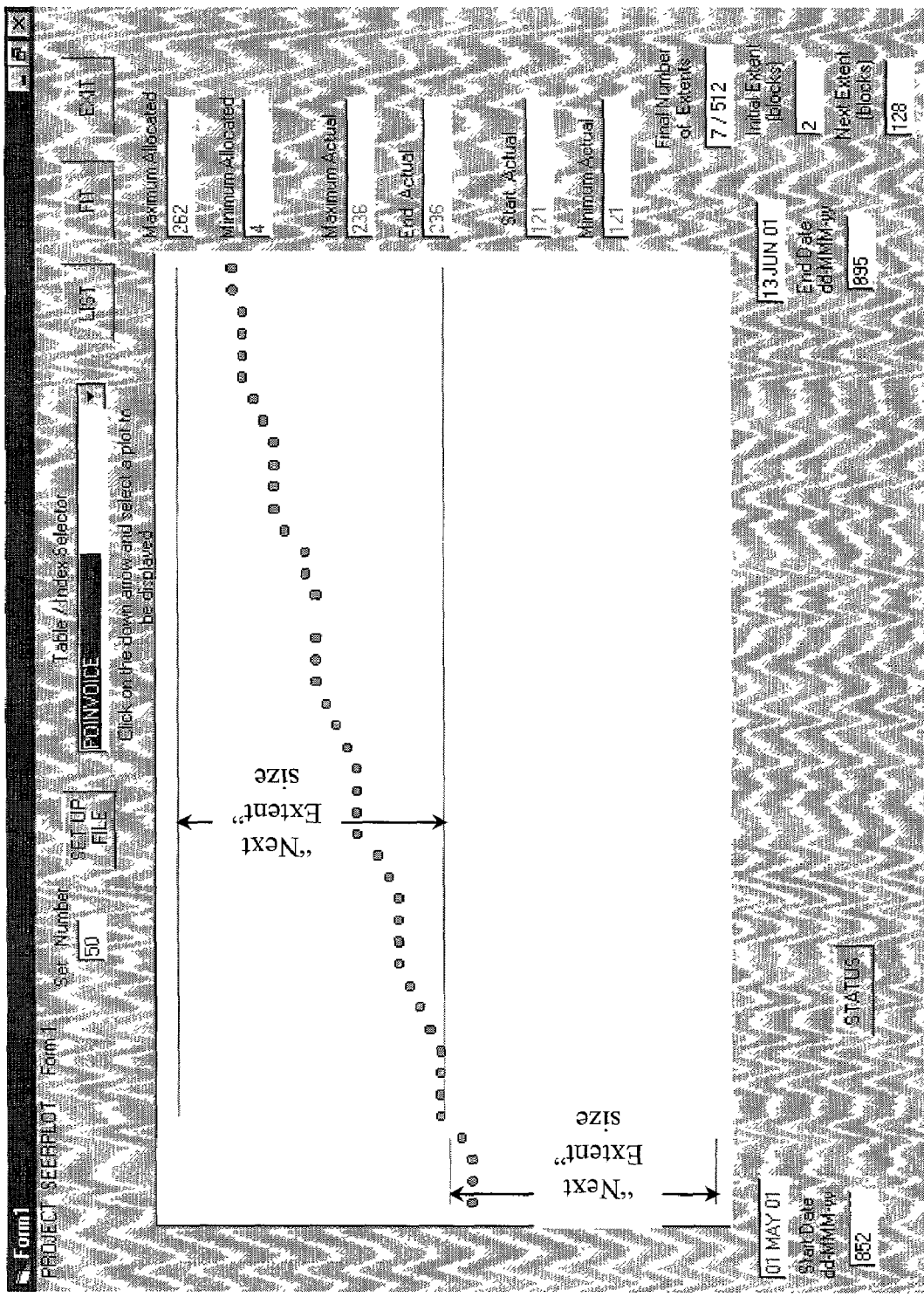
FIG. 14 is a pictorial representation of a graphical display of a time history plot of usage of a second embodiment of this invention.
Figure 16:
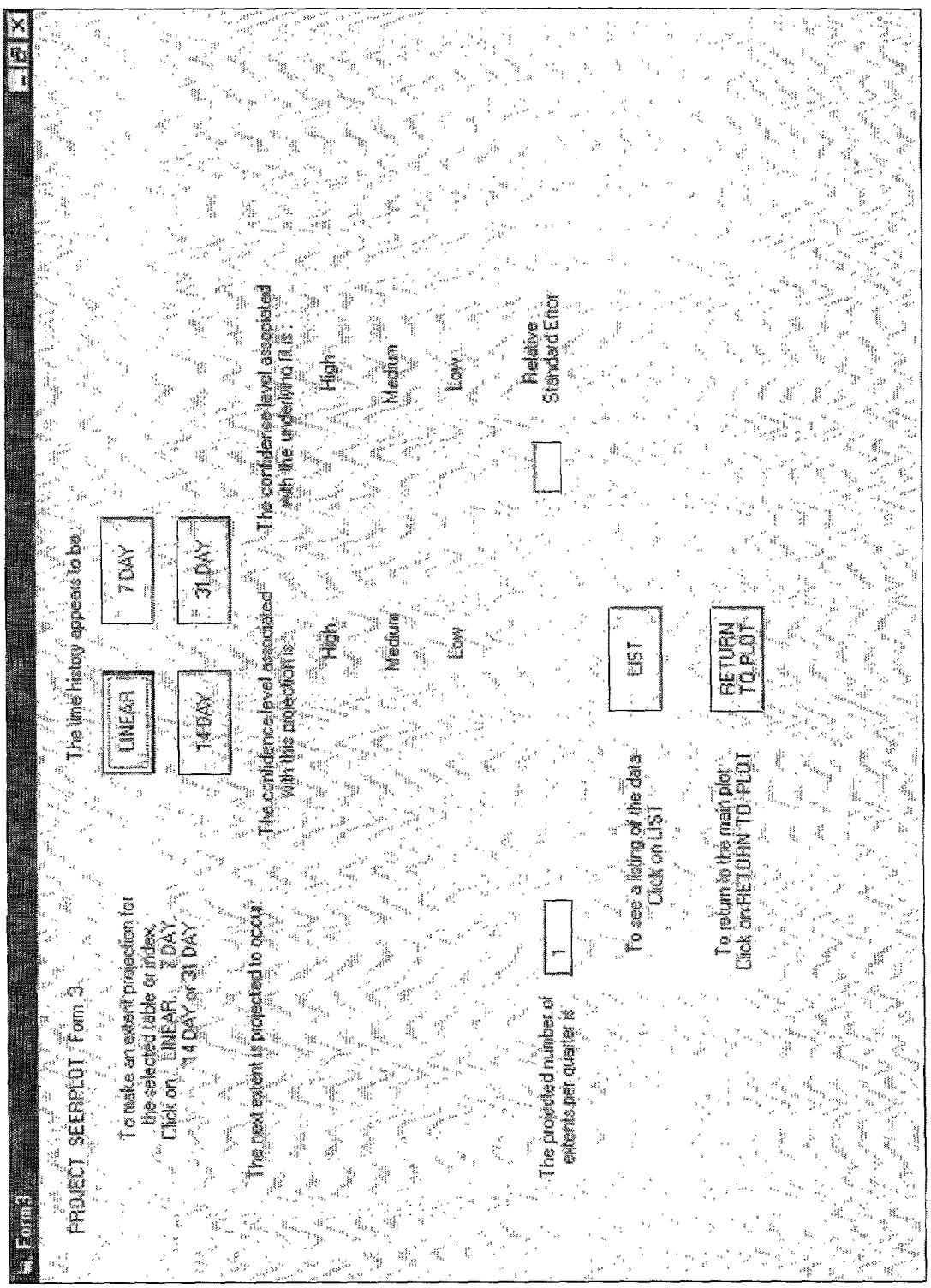
FIG. 16 is a pictorial representation of a display of the basic curve fitting and pattern recognition screen of a second embodiment of this invention.
Figure 17A:
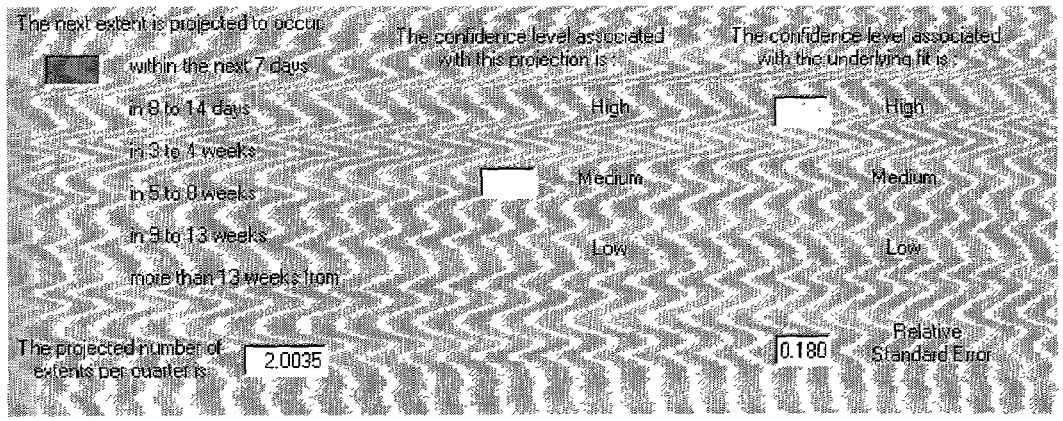
FIGS. 17a, b, c and d are pictorial representations of a display of a second embodiment of this invention showing a comparison of the outputs from several different fit type options for the time history shown in FIG. 14.
Figure 17B:
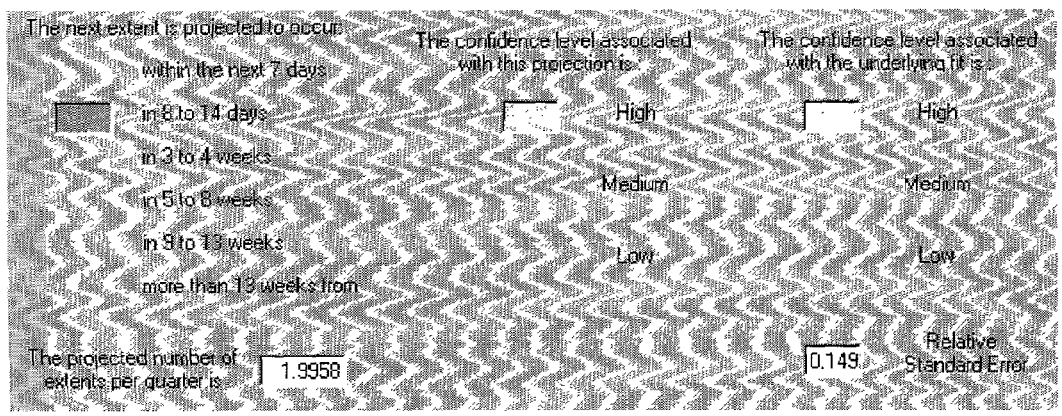
Figure 17C:
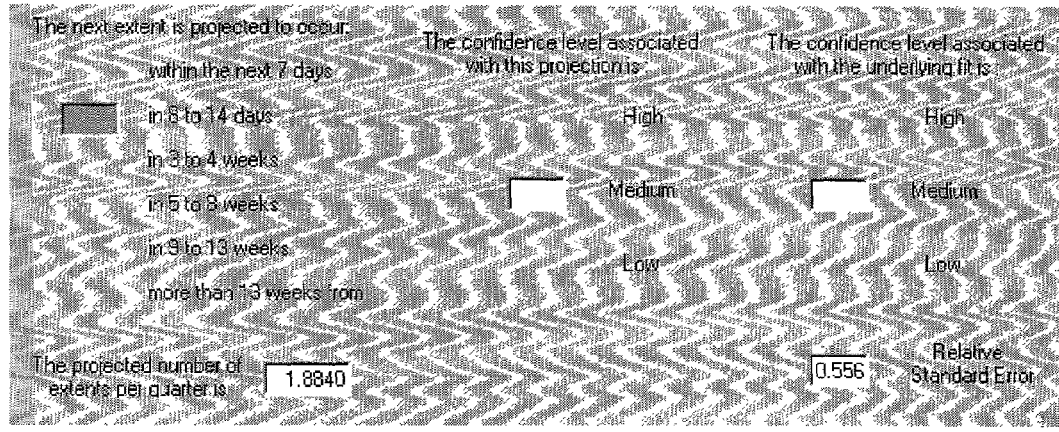
Figure 17D:
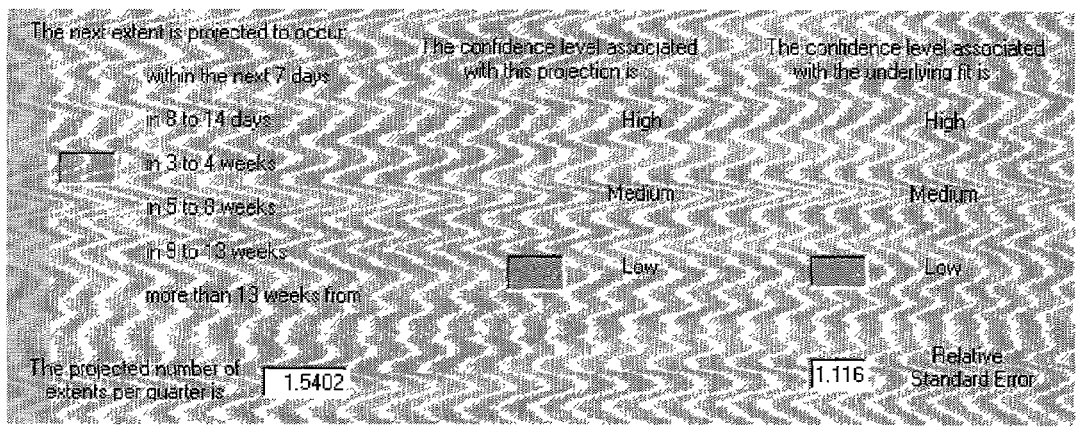

General summaries of the significant attributes of the operator's and the analyst's versions, respectively, of the main display are presented pictorially in FIGS. 11*a* and 11*b*.

The preferred operating configuration for the invention has the operator's version running continuously, primarily in DARK DISPLAY mode in the operations control room. At each automatic update of the display, typically every thirty minutes in the present application, and at each manually initiated update the operator would check the display and, should new "bad and worsening" indications have appeared, he or she would determine with the aid of the tutorial and supplementary information capabilities what response is called for. Having identified the appropriate actions to be taken, the operator would acknowledge the display and initiate the required response, which would always include some form of notifying the responsible analyst. It is well known to provide an audible signal when an update occurs. In this embodiment, it would be beneficial to provide a second or alternative audible alarm if the update has uncovered one or more new "bad and worsening" indications.

Depending on the nature and severity of the threat identified by the operator, the analyst would activate the analyst's version of the main display which might be installed at a remote location, evaluate the circumstances and possible consequences of the situation, using as needed, current and historical records from the chronological history files, and initiate protective, corrective or restorative measures.

During non-crisis times, analysts would be able to use the analyst's version to explore prospective improvements in tile visual format selection logic and boundary set point and reference standard error settings to refine aspects of the generation of the main display that are shared by both versions. When changes in the display generation logic and/or set point and reference standard error values have been tested in the analyst's version and approved, the changes would be incorporated in the operator's version software so that the displays in the two versions would remain effectively identical.

A second embodiment applies the display system of this invention to the administration of large relational databases, such as those that are supported by the ORACLE methodology and software licensable from the ORACLE Corporation, 500 Oracle Parkway, Redwood Shores, Calif. 94065. At the heart of relational database administration are two issues. The first is concerned with minimization of overall data storage resources in the array of hard drives committed to contain the total volume of data stored and to be stored in the very large number of individual tables and indexes that make up the relational database. The second has to do with the question of fragmentation of the respective tables and indexes as, over time, the total amount of data stored in a given table or index exceeds the space initially allotted to it and new blocks of hard drive space in the storage array, almost always physically separated from the original block, are allotted to contain the overflowing data directed to the table or index. The primary consideration in the issue of hard drive space is cost. The primary consideration in the issue of fragmentation is access time.

Thus, the goal of database administration is twofold; first, the administrator must allot to each of the thousands (or tens of thousands) of individual tables and indexes that make up a typical relational database an adequate, but not excessive, initial block of storage, called an "Initial Extent" in ORACLE applications, that is able to contain all of the current data of the table or index in question, with some modest margin for near-term growth. Second, the administrator must allot to each table and index an additional block size of storage, called a "Next Extent" in ORACLE usage, that can be repeatedly added from time to time in sequential steps to expand the total effective capacity of the table or index as the amount of data stored grows in time. Since the Initial Extent space of the given table or index is allotted once, while the successive Next Extents come into being as needed wherever a suitable block of uncommitted storage is found on the hard drive array, fragmentation of the table or index becomes progressively more severe as the number of Next Extents made increases.

One common rule of thumb suggests that for tables and indexes whose contents tend to grow steadily in time, the Initial Extent and Next Extent parameters for each individual table and index should be so sized that typically one, or at most, two Next Extents occur in any three month period, assuming, as is common, that manual reallocation of space throughout the entire database, called "resizing the database", is done on a nominal six month to a year basis. A second rule of thumb states that for tables or indexes whose contained volume of data is nominally static, the Initial Extent parameter for such tables or indexes should be sized to contain the stored data with only a small margin for future growth, and that the corresponding Next Extent parameter should be set as small as possible.

The challenge posed to the database administrator is that of anticipating the growth pattern, in terms of bytes actually used for data storage of each of thousands or possibly tens of thousands of tables and indexes in the relational database for which he or she is responsible, so that start-up values of all of the Initial Extent and Next Extent parameters can be assigned. Thereafter, the administrator must periodically update each parameter setting on the basis of ongoing monitoring of the actual growth, or lack of growth, of each of the tables and indexes to allow the most efficient utilization of the database, both in cost and in time. It will be appreciated that the effort that must be expended by skilled professional database administrators in sifting through a six month or one year accumulation of printed or displayed periodic usage reports, to characterize growth patterns and project table and index size requirements for the thousands or tens of thousands of individual tables and indexes in an operating relational database, is staggering.

The display system of this invention can simplify the task of database management by automatically processing usage files generated daily by the database support software:

a. To extract usage characteristic information for each table and index;
b. To apply preformulated guidelines for efficient usage of hard drive space for each table and index;
c. To detect departures from the guidelines by individual tables or indexes; and
d. To display the results of such ongoing reviews in an easy to understand, but comprehensive form, on a computer screen or in printed form.

Figure 12:
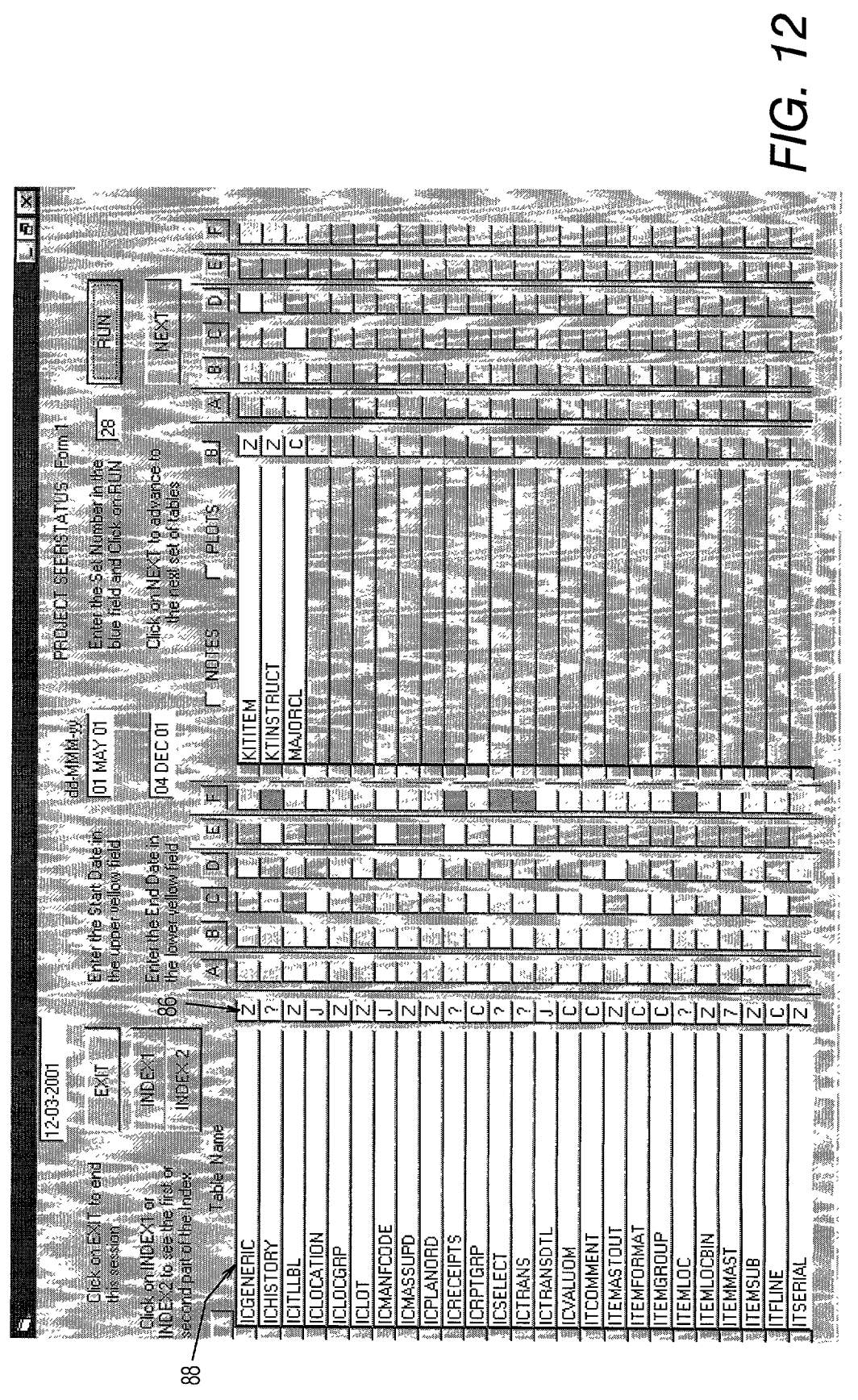
Figure 13:
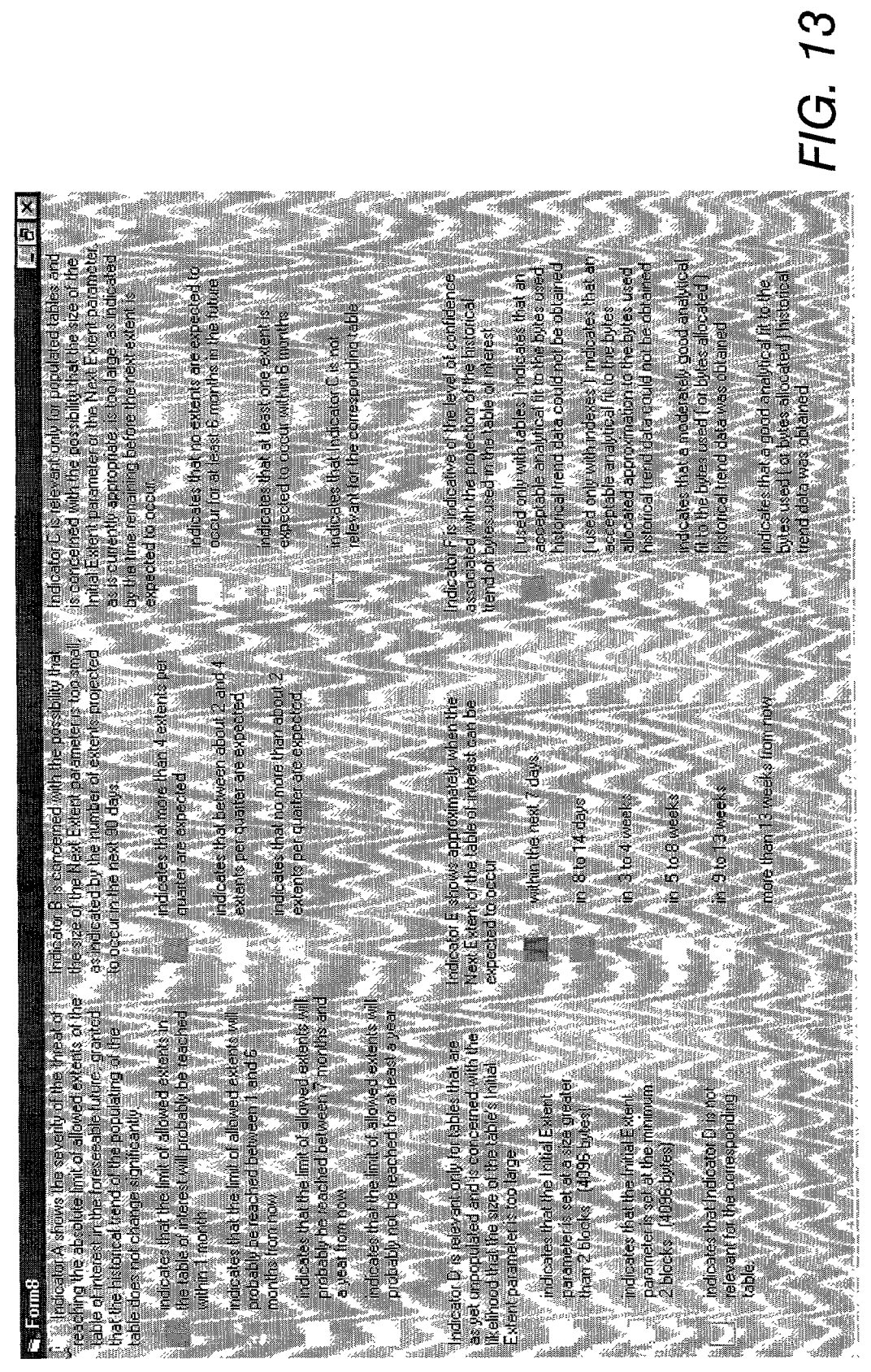

The methodology for accomplishing the foregoing is taken, in large part, from that described above with regard to the preceding embodiment. In this application, extensive use is made of the curve-fitting and pattern recognition algorithms (1), (2) and (3) set forth above. The basic display format used for this application is similar in layout to that shown in FIG. 4 and is illustrated in FIG. 12. The set of six tutorial screens shown in FIG. 13 provide descriptions of the several indicators, which are analogous to the vital signs of the previous embodiment. The tables listed in the display screen illustrated in FIG. 12 represent one of many functional subgroupings of the whole collection of tables and indexes in the database. While this example is limited to tables, it should be appreciated that the same methodology applies as well to indexes which are subsets of tables.

The most obvious correspondence between the previous embodiment and this application are:

(a) in the direct substitution of tables and indexes as the components of the complex system in place of servers in the earlier application; and
(b) in the corresponding replacement of the "vital signs" columns by the essentially identical "indicator" columns.

Figure 18:
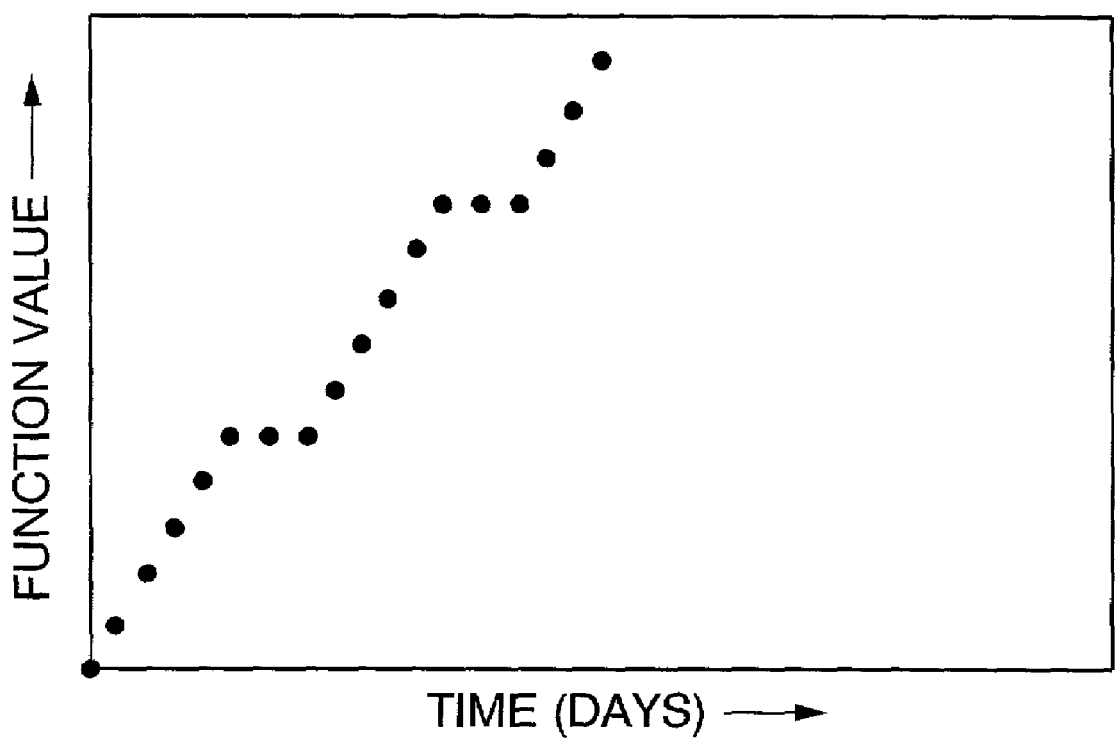
FIG. 18 is a graphical illustration identifying an example of a model of a trend in a database activity application.

The identification of changes in trends that underlies the concept of "change" or "trend" tiles in the earlier application now takes the form of identification of historical trend types as indicated by the characters in the small text fields 86 immediately to the right of the table name fields 88. In the fields 86, "O" indicates all entries in the table are zero, "C" indicates no change in the entries in time over the observed interval, "L" indicates a linear best fit, "7", "14", "31" indicate weekly, fortnightly and monthly cyclic pattern best fits. This determination of historical trend type is accomplished by employing a function conceptually the same as the $f_j^k(x_n)$ functions in equation (1) set forth above to extract true change of trend type information from the available time history records of byte usage and to incorporate true "change" tiles in an extension of the display shown in FIG. 12. FIG. 18 illustrates an example of a seven day cycle function for a database activity application, which is one of the j-type functions. Since the day of the week is not identified in the usage file generated by the ORACLE support software, it is necessary to shift the function with respect to the trend data, which is accounted for by the k superscript, until the explicit weekends in the function match the two day periods of inactivity in the input data.

The concept of "alarm" tiles utilized in the previous application is taken over into this application in the variously colored boxes or "tiles" in the usage of the previous embodiment, under the column headings "A", "B", "C" and "D". Again, shifts from green through yellow and onto red signal progressively either an approach to a hard limit or an increasing departure from one of the rules of thumb that characterize efficient database utilization.

An extension of the concepts described in the earlier embodiment is to be found in the use of the results of the application of the curve fitting and pattern recognition algorithms to project table or index storage requirements, including the timing of the execution of needed "Next Extents", into the future on the basis of recent chronological records. From an analytical point of view, projection ahead in time is an extension of the concepts of historical trend curve fitting and characterization by pattern recognition. The status information communicated in columns "A", "B" and "C" incorporates projections of table usage made using the results of the best fits to the historical usage trends computed for the respective tables and indexes.

The estimates of the timing of the "Next Extent" that appear in column "E" are more of operational interest than of administrative concern. The necessary information for database resizing is already incorporated in columns "A" through "D", and so the column "E" tiles serve primarily as "heads up" indicators of "Next Extent" activity for the respective tables. It should be appreciated that the preselected limiting number of bytes that defines when a "Next Extent" is to be added is an administrative limit, i.e., one of the "rules of thumb" used as guidelines in the administrative sizing of the database, as contrasted with a hard limit invoked by the database software. A hard limit, for example, is the total number of extents that can be made by any table or index without resizing that table or index. This limit is imposed by the database software. Indicator "A" in FIG. 12 monitors the approach of each respective table and index to its predefined limit. The consequence of any table or index reaching its number of extents limit is total database lockup.

The rules of thumb are guidelines devised by the database administrator to aid in updating the values of the Initial Extent and Next Extent parameters for each table and index at the next general database resizing. Indicators "B", "C" and "D" track compliance with these rules of thumb. Departure of a table or index from these guidelines yields inefficiency but not shutdown of the database. It should be appreciated that the size of the Next Extent parameter assigned to any table or index is, from a database software point of view, completely arbitrary. The only issue is efficiency of operation.

The column "F" indicators serve a much more fundamental role in that they provide qualitative measures of the confidence that can be placed in the validity of the projections that underlie the indications in columns "A", "B", "C" and "E" for each table. The confidence level estimates are made on the basis of statistical evaluation of the variances of the best fits obtained, with additional considerations regarding the types of best fits, where appropriate.

The concept described previously with regard to the use of separate displays for the operator and the analyst that were distinct because of their different levels of training and skill apply differently in this application. In the present case, all of the anticipated users of the system are expected to be professional database administrators, although not all necessarily will have the same level of expertise. The summary displays represented by FIG. 12 are intended more for relatively junior database administrators charged with the responsibility for recognizing that redefinition of the values of the "Initial Extent" and "Next Extent" parameters of specific tables and indexes is in order at the next scheduled resizing of the database. More detailed displays of the forms illustrated in FIGS. 14–17 are available on demand by the senior administrators to show details both of the time histories of the usage of space allotted to specific tables and indexes and of the characteristics of the several fit options utilized in generating the best estimate projections of future growth of the respective tables and indexes.

While specific embodiments of the invention have been described in detail, it will be appreciated by those skilled in the art that various modifications and alternatives to those details could be developed in light of the overall teachings of the disclosure. For example, different colors and geometric patterns can be chosen for the display fields or tiles, or the display system can be applied to processes other than local area network servers, e.g., gasoline refining processes, central station electric generating processes or any other complex process, especially those employing parallel process lines. Additionally, while the invention has been applied to the same components in a system, i.e., servers in the preferred embodiment, the invention may also be applied to analogous components in a system, that share some interrelated properties. Analogous in this context is used in a very broad sense. For example, the invention can be applied to monitor parameters such as pressure, temperature, liquid level, power level, and margin to runback/trip as vital signs of a boiler, heat exchanger, turbogenerator, condensor and the various pumps of a power generation system. Accordingly, the particular embodiments disclosed are meant to be illustrative only and not limiting as to the scope of the invention which is to be given the full breadth of the appended claims and any and all equivalents thereof.

What is claimed is:

1. A display system for tracking a process having a plurality of homogeneous components that are respectively monitored via corresponding signal outputs representative of an operating condition of the component monitored, comprising:
    an input terminal for receiving the signal outputs;
    a processor for operating on the signal outputs received at the input terminal; and
    a plurality of display tiles arranged in columns and rows with either of said columns or rows respectively representative of said homogeneous components and the other of said columns or rows respectively representative of a vital sign of the corresponding homogeneous component indicative of the component's operating condition that is derived from the corresponding signal output, wherein substantially each tile portrays a state of the corresponding vital sign as either a color coded alarm format which indicates whether the vital sign is within or out of operating limits and how close to limits it is or a color coded representation of trends format which identifies trends of the vital sign.

2. The display system of claim 1 wherein the color coded representation of trends is a coded geometric shape.

3. The display system of claim 2 wherein the coded geometric shape identifies a type of change of the trends of the vital sign.

4. The display system of claim 1 wherein the color coded representation of trends format identifies a change in a value of the vital sign or a rate of change of the value of the vital sign over a given period.

5. The display system of claim 4 wherein the color coded representation of trends is a coded geometric shape that employs color to emphasize the magnitude of a change in value or rate of change in value of the vital sign.

6. The display system of claim 4 wherein the color coded representation of trends format identifies the direction in the change in value of the vital sign.

7. The display system of claim 6 wherein the color coded representation of trends is a coded geometric shape that employs color to emphasize the direction in the change in value of the vital sign.

8. The display system of claim 1 wherein the color coded representation of trends is derived from a curve fitting algorithm.

9. The display system of claim 8 including means for establishing the probable validity of a result of the application of the curve-fitting algorithm.

10. The display system of claim 1 wherein the color coded alarm display format distinguishes between alarm states in which component malfunction or failure either has occurred or can be expected where a limiting value used for a set point is a true physical limit from those where the limiting value used for the set point is an administrative limit.

11. The display system of claim 1 wherein the display tiles are updated periodically and historical data is stored in a chronological format.

12. The display system of claim 11 wherein the periodic updating is performed automatically at a scheduled interval, including a manual update command button for updating the display tiles between the scheduled interval upon an operator command.

13. The display system of claim 12 wherein data obtained through the manual update command is discarded once displayed and not stored as part of the chronological format.

14. The display system of claim 1 wherein the display tiles are rectangular.

15. The display system of claim 1 wherein the plurality of display tiles form a matrix of the row and columns which is programmed to display in a plurality of modes upon operator command.

16. The display system of claim 15 wherein the plurality of modes includes a Snapshot mode that presents substantially a full set of indications of the vital signs for substantially all components monitored at a common point in time.

17. The display system of claim 16 wherein the plurality of modes includes a Dark Display mode that presents substantially only those vital sign indications that represent conditions that have progressed in severity from a first state, with respect to an opening limit of the corresponding component, to a second worse state with respect to the operating limit, that will likely require an operator response.

18. The display system of claim 17 wherein the Dark Display mode is the default mode of display.

19. The display system of claim 15 wherein the plurality of modes include a Dark Display mode that presents substantially only those vital sign indications that represent conditions that have progressed in severity from a first state, with respect to an operating limit of the corresponding component, to a second worse state with resect to the operating limit, that will likely require an operator response.

20. The display system of claim 15 wherein the Dark Display mode is a default mode.

21. The display system of claim 1 wherein clicking on a given tile opens a display that provides additional details of the information of the vital sign displayed by that tile.

22. The display system of claim 1 including an acknowledgment button that when activated by the operator records an acknowledgement that the operator observed a given adverse state of the vital sign of one of the components shown on the display tiles.

23. The display system of claim 22 wherein a function of the acknowledgment button is to record when the given adverse state of the vital sign of one of the components shown on the display tiles is not acknowledged by the operator.

24. The display system of claim 22 wherein the acknowledgement function when activated stores a summary of information about the vital sign being acknowledged.

25. The display system of claim 1 including a tutorial which is displayed when an operator clicks on a position on the column or row that displays the vital signs, that displays instructions to the operator, wherein a relevant portion of the instructions is highlighted where one of the tiles in the corresponding row or column shows a display format that indicates an alarm set point is being approached or exceeded.

26. The display system of claim 25 wherein the highlighting is the same color as the display tile that indicates an alarm set point is being approached or exceeded.

27. The display system of claim 25 wherein the tutorial explains the relevance of the vital sign that the operator clicked on in assessing the health of the process being tracked.

28. The display system of claim 25 wherein the tutorial specifies response procedures to be carried out by the operator, should particular tile formats appear in the column or row of the vital sign the operator clicked on.

29. The A display system for tracking a process having a plurality of components that are respectively monitored via corresponding signal outputs representative of an operating condition of the component monitored, comprising:
    an input terminal for receiving the signal outputs;
    a processor for operating on the signal outputs received at the input terminal;
    a plurality of display tiles arranged in columns and rows with either of said columns or rows respectively representative of said components and the other of said columns or rows respectively representative of a vital sign of the corresponding component indicative of the component's operating condition that is derived from the corresponding signal output, wherein substantially each tile portrays a state of the corresponding vital sign as either a color coded alarm format which indicates whether the vital sign is within or out of operating limits and how close to limits it is or a color coded representation of trends format which identifies trends of the vital sign; and
    wherein the color coded representation of trends is a coded geometric shape that identifies a type of change of the trends, selected from the group of slow offset, fast offset and gradual slope change.

30. The display system of claim 29 wherein the type of change of the trends is identified by the coded geometric shape formed from the interface of two colors on a tile.

31. The display system of claim 30 wherein the geometric shape provides a corresponding visual image of the type of change.

32. A display system for tracking a process having a plurality of components that are respectively monitored via corresponding signal outputs representative of an operating condition of the component monitored comprising:
    an input terminal for receiving the signal outputs;
    a processor for operating on the signal outputs received at the input terminal;
    a plurality of display tiles arranged in columns and rows with either of said columns or rows respectively representative of said components and the other of said columns or rows respectively representative of a vital sign of the corresponding component indicative of the component's operating condition that is derived from the corresponding signal output, wherein substantially each tile portrays a state of the corresponding vital sign as either a color coded alarm format which indicates whether the vital sign is within or out of operating limits and how close to limits it is or a color coded representation of trends format which identifies trends of the vital sign and wherein the plurality of display tiles form a matrix of the rows and columns which is programmed, upon operator command, to display in a plurality of modes, including a Snapshot mode that presents substantially a full set of indications of the vital signs of substantially all components monitored at a common point in time; and
    an operator version wherein the plurality of modes include a Dark Display mode that presents substantially only those vital sign indications that represent conditions that have progressed in severity from a first state, with respect to an operating limit of the corresponding component, to a second worse state with respect to the operating limit, that will likely require an operator response, further including an analyst version of the display system that comprises a Component History mode that shows a set of vital sign indications for one selected component at successive points in time over a given interval of time in the past.

33. The display system of claim 32 wherein the analyst version is run off-line.

34. The display system of claim 32 wherein the analyst version is recompiled from source code each time it is activated.

35. The display system of claim 32 wherein the analyst version further includes one and/or the other of the Snapshot mode and the Dark Display mode.

36. The display system of claim 32 wherein an analyst can communicate with an operator through the analysts version.

37. The display system of claim 32 wherein the analysts version provides an analyst with the capability to review or revise chronological history files or create new chronological files to simulate hypothetical scenarios for testing display validity and/or for training purposes.

38. The display system of claim 37 wherein the analysts version provides an analyst with the capability of reviewing analyst run with data in the chronological history files.

39. The display system of claim 32 wherein the analyst version is run at a different location than the operator version.

40. A display system for tracking a process having a plurality of components that are respectively monitored via corresponding signal outputs representative of an operating condition of the component monitored, comprising:
    an input terminal for receiving the signal outputs;

a processor for operating on the signal outputs received at the input terminal; and a plurality of display tiles arranged in columns and rows with either of said columns or rows respectively representative of said components and the other of said columns or rows respectively representative of a vital sign of the corresponding component indicative of the component's operating condition that is derived from the corresponding signal output, wherein substantially each tile portrays a state of the corresponding vital sign as either a color coded alarm format which indicates whether the vital sign is within or out of operating limits and how close to limits it is or a color coded representation of trends format which identifies trends of the vital sign an wherein the plurality of display tiles form a matrix of the rows and columns which is programmed, upon operator command, to display in a plurality of modes, including a Component History mode that shows a set of vital sign indications for one selected component at successive points in time over a given interval of time in the past.

41. A display system for tracking a process having a plurality of components that are respectively monitored via corresponding signal outputs representative of an operating condition of the component monitored, comprising:

an input terminal for receiving the signal outputs;

a processor for operating on the signal outputs received at the input terminal; and a plurality of display tiles arranged in columns and rows with either of said columns or rows respectively representative of said components and the other of said columns or rows respectively representative of a vital sign of the corresponding component indicative of the component's operating condition that is derived from the corresponding signal output, wherein substantially each tile portrays a state of the corresponding vital sign as either a color coded alarm format which indicates whether the vital sign is within or out of operating limits and how close to limits it is or a color coded representation of trends format which identifies trends of the vital sign and wherein the color coded alarm format identifies a prediction of the timing of a given state of the vital sign.

42. A display system for tracking a process having a plurality of homogeneous components that are respectively monitored via corresponding signal outputs representative of an operating condition of the component monitored, comprising:

an input terminal for receiving the signal outputs;

a processor for operating on the signal outputs received at the input terminal; and a plurality of display tiles arranged in columns and rows with either of said columns or rows respectively representative of said homogeneous components and the other of said columns or rows respectively representative of a vital sign of the corresponding homogeneous component indicative of the component's operating condition that is derived from the corresponding signal output, wherein substantially each tile portrays a state of the corresponding vital sign as either a changeable geometric pattern or a solid coded color pattern or a pattern containing a combination of both depending on the state of the vital sign and substantially each tile is programmed to display all three patterns, the pattern displayed at any one time corresponding to the operating state of the respective vital sign.

43. A display system for tracking a process having a plurality of components that are respectively monitored via corresponding signal outputs representative of data pertaining to a vital sign of an operating condition of the component monitored, comprising:

an input terminal for receiving the signal outputs;

a processor for operating on the data received at the input terminal, wherein the processor accesses the data received over time and solves a curve fitting algorithm with the data to identify trends in the data and from the trends provides a prediction of the timing of a given state of the vital sign that is to occur in the future; and a plurality of display tiles arranged in columns and rows with either of said columns or rows respectively representative of said components and the other of said columns or rows respectively representative of the vital sign of the corresponding component indicative of the component's operating condition that is derived from the corresponding signal output, wherein substantially each tile portrays the prediction of the corresponding vital sign as a color coded format.

44. The display system of claim 43 wherein the process is a relational database operation and the components are tables and/or indexes in the relational database.

45. The display system of claim 44 wherein the vital sign is the number of bytes occupied in the table or index in relation to a pre-established limit which identifies the given state, over time, and the given state is the occurrence of a Next Extent or a hard limit.

* * * * *